United States Patent
Takamori

[11] Patent Number: 5,888,071
[45] Date of Patent: Mar. 30, 1999

[54] LEARNING APPARATUS

[76] Inventor: Keisuke Takamori, 23-12, Eifuku-4, Suginami-ku, Tokyo, Japan

[21] Appl. No.: 45,670
[22] Filed: Mar. 23, 1998

Related U.S. Application Data

[63] Continuation of Ser. No. 597,027, Feb. 5, 1996, abandoned.

[30] Foreign Application Priority Data

Oct. 3, 1995 [JP] Japan ................................ 7-256590

[51] Int. Cl.⁶ ........................... G09B 19/00; G09B 19/06
[52] U.S. Cl. ............................................ 434/156; 434/157
[58] Field of Search .................................. 434/156, 157, 434/322, 323

[56] References Cited

U.S. PATENT DOCUMENTS 4,509,137  4/1985  Yoshida ........................................ 704/7
5,316,485  5/1994  Hirose ........................................ 434/322

Primary Examiner—Robert A. Hafer
Assistant Examiner—John Edmund Rovnak
Attorney, Agent, or Firm—Rogers & Killeen

[57] ABSTRACT

A device for teaching, language skills is disclosed. In the teaching device, a predetermined number of questions are displayed on a display. The predetermined number is determined dependent on a level of a learner. The learner inputs answers to the questions to be displayed on the display. The answers are discriminated to be correct or incorrect. The device teaches correct answers for the incorrect answers repeatedly.

A question for a level of the learner which is higher than a predetermined level is removed from the predetermined number of questions.

10 Claims, 30 Drawing Sheets

FIG. 9
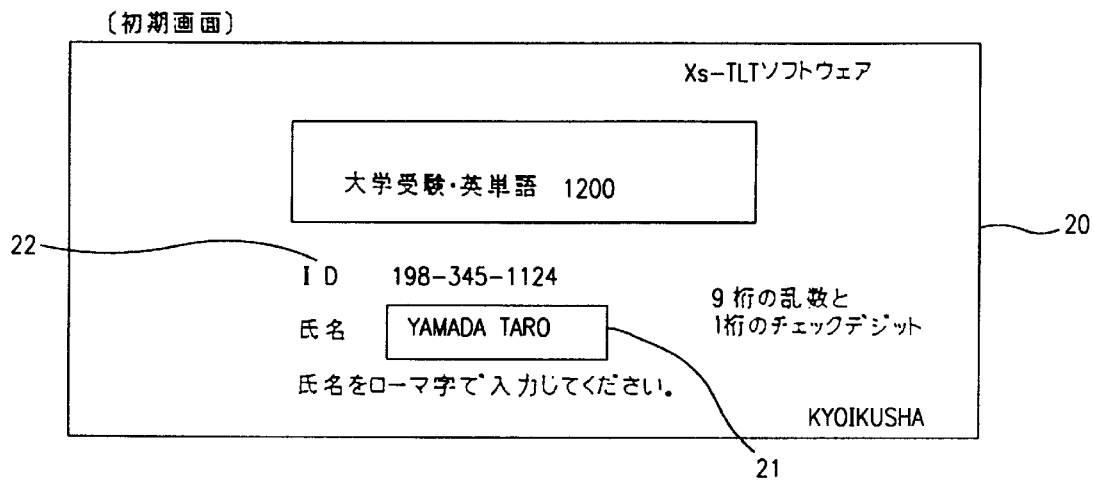
TRANSLATION OF FIG. 9
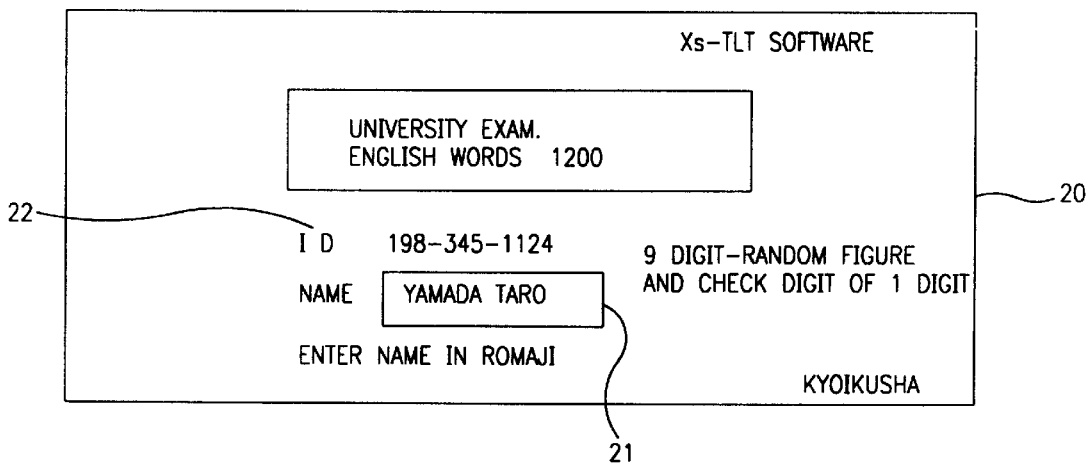

(YES)  (NO)
 Y      N

このソフトはどの時点でも学習を終了することができます。
次回はその続きから自動的にスタートします。
学習を終了するときは「Esc」を押してください。

― 23

TRANSLATION OF FIG. 10

(INITIAL DISPLAY)

THE EVALUATION OF THE MASTERED CLASS
IS NECESSARY BY TEST ?
(YES)  (NO)
 Y      N

THIS SOFTWARE CAN TERMINATE THE LEARNING AT ANY POINT OF TIME.
NEXT TEST AUTOMATICALLY WILL START FROM THE SEQUEL.
PLEASE PUSH "Esc" FOR THE TERMINATION OF LEARNING.

TRANSLATION OF FIG. 11

(NO DISPLAY)

```
              PLEASE ENTER THE MASTERED CLASS. ( )
         THE MASTERED CLASS IS DECIDED WITH THE SCORE WHICH IS COUNTED
         AT THE RATE OF POINT 5 PER A CORRECTLY ANSWERED WORD FOR
         RANDOMLY SELECTED 20 WORDS.
                              NOS. PER BLOCK
         a:    ≥    POINT 70      30
         b:    ≥    POINT 60      25
         c:    ≥    POINT 50      20
         d:    ≥    POINT 40      15
         e:    <    POINT 40      10

[RETURN/F1]
```

(YES画面)　　　　　　　　　　　　　　　　　　　　26

```
        ┌─────────────────┐
        │  テストを開始する  │
        └─────────────────┘
           (YES)   (NO)
             Y       N
```

・テストは英単語が表示され、その日本語の意味を入力するものです。
・意味の入力はローマ字入力すると平仮名に変換されます。
・答えを入力している途中で結果を自動判定します。
・自動判定の結果が間違っているときは〔○〕か〔×〕を押して判定
　結果を修正してください。
・「Enter」を押すと次の単語の意味を入力できます。
・テストの単語数は全部で20単語です。
　　　最後まで頑張りましょう！

TRANSLATION OF FIG. 12

(YES DISPLAY)　　　　　　　　　　　　　　　　　26

```
        ┌─────────────────┐
        │   START OF TEST  │
        └─────────────────┘
           (YES)   (NO)
             Y       N
```

• AN ENGLISH WORD IS DISPLAYED AND ITS JAPANESE MEANING IS ENTERED IN THIS TEST.
• WHEN THE MEANING IS ENTERED IN ROMAJI, IT IS CONVERTED TO HIRAGANA.
• THE RESULT IS AUTOMATICALLY EVALUATED IN THE PROCESS OF ENTERING AN ANSWER.
• WHEN THE RESULT IS WRONG IN THE AUTOMATIC EVALUATION, PUSH THE KEY (O) OR (X)
　TO MODIFY THE RESULT.
• PUSHING THE KEY (Enter), YOU CAN ENTER THE MEANING OF THE NEXT WORD.
• THE SUM TOTAL OF TESTING WORDS IS 20.
　　STAND IT OUT !

TRANSLATION OF FIG. 13

(TEST DISPLAY)　　　　　　　　　　　　　　　　　27

ENTER MEANING OF WORD.

■　[ WORD ]　　[ PHONETIC SYMBOL ]

[ MEANING ]　[ EVALU-ATION ]～29

28

☐ (PART OF SPEECH 1) MEANING 1/MEANING 2/MEANING 3
　(PART OF SPEECH 2) MEANING 1/MEANING 2/MEANING 3

| | | | |
|---|---|---|---|
| 番号 | 0001 | 綴り experience | 発音 Ikspirins |
| 品詞1 | 名 | 経験 | 体験 |
| 品詞2 | 動 | 経験する | 体験する |
| 例文1 | Learn by (experience) | | |
| 訳1 | 経験によって学ぶ | | |
| 例文2 | (experience) great hardship in the desert | | |
| 訳2 | 砂漠でたいへん難儀する | | |
| 例文3 | have long (experience) as a doctor | | |
| 訳3 | 医者として長い経験を持つ | | |
| 例文4 | It is good (experience) to~ | | |
| 訳4 | ~するのはよい経験だ | | |
| 例文5 | | | |
| 訳5 | | | |
| 例文6 | | | |
| 訳6 | | | |
| 別類 | | | |
| 解説 | exper(試みる)と-ence(名詞語尾)が結びついて試みて得た知識すなわち「経験」。▽形容詞experiencedは「経験豊かな」ほうだ。an experienced thiefといえば「経験豊かな盗賊」だ。語根experを含む語の仲間には、他にexpert「専門家」、experimentで「実験」などがある。 | | |

| | |
|---|---|
| 派生1 | |
| 例文1 | |
| 訳1 | |
| 例文2 | |
| 訳2 | |
| 派生2 | |
| 例文1 | |
| 訳1 | |
| 例文2 | |
| 訳2 | |
| 読み | けいけん；たいけん、けいけんする、たいけんする |
| 仮名 | け、い、け、ん |

更新　　次　　前　　JUMP　　終了

| NO. | 0001 | SPELL-ING | experience | | PHONETIC SYMBOL | Ikspi ri ns | | DERIVA-TIVE 1 | |
|---|---|---|---|---|---|---|---|---|---|
| PART OF SPEECH 1 | NOUN | | 経験 | | | | | EXAMPLE 1 | |
| PART OF SPEECH 2 | VERB | | 経験する | 体験する | | | | TRANS-LATION 1 | |
| EXAMPLE 1 | Learn by (experience) | | | | | | | EXAMPLE 2 | |
| TRANS-LATION 1 | 経験によって学ぶ | | | | | | | TRANS-LATION 2 | |
| EXAMPLE 2 | (experience) great hardship in the desert | | | | | | | DERIVA-TIVE 2 | |
| TRANS-LATION 2 | 砂漠でたいへん難儀する | | | | | | | EXAMPLE 1 | |
| EXAMPLE 3 | have long (experience) as a doctor | | | | | | | TRANS-LATION 1 | |
| TRANS-LATION 3 | 医者として長い経験を持つ | | | | | | | EXAMPLE 2 | |
| EXAMPLE 4 | It is good (experience) to~ | | | | | | | TRANS-LATION 2 | |
| TRANS-LATION 4 | ~するのはよい経験だ | | | | | | | READING | けいけん, たいけん, けいけんする, たいけんする |
| EXAMPLE 5 | | | | | | | | | |
| TRANS-LATION 5 | | | | | | | | | |
| EXAMPLE 6 | | | | | | | | | |
| TRANS-LATION 6 | | | | | | | | | |
| OTHER ANSWER | | | | | | | | KANA | け, た, け, た |
| COMMENTS | exper(試みる)と-ence(名詞語尾)が結びついて「試みて得た知識」すなわち「経験」。▽形容詞experiencedは「経験豊かな」、an experienced thiefといえば「経験豊かなどろぼう」だ。語根experを含む語の仲間には、他にexpertで「専門家」、experimentで「実験」などがある。 | | | | | | | | |

[ RENEWAL ] [ NEXT ] [ BEFORE ] [ JUMP ] [ END ]

TRANSLATION OF FIG. 14

FIG. 15
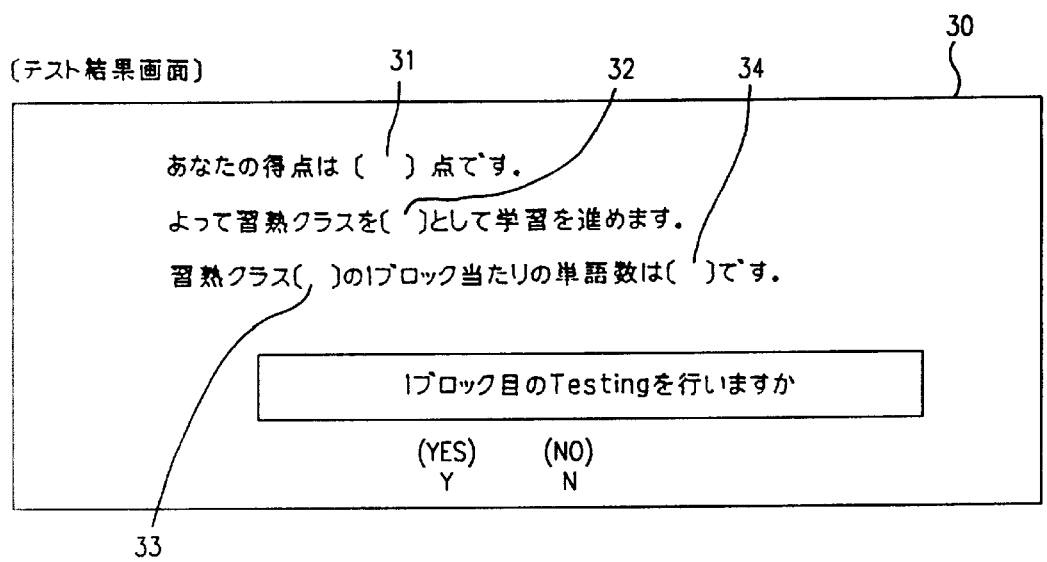
TRANSLATION OF FIG. 15
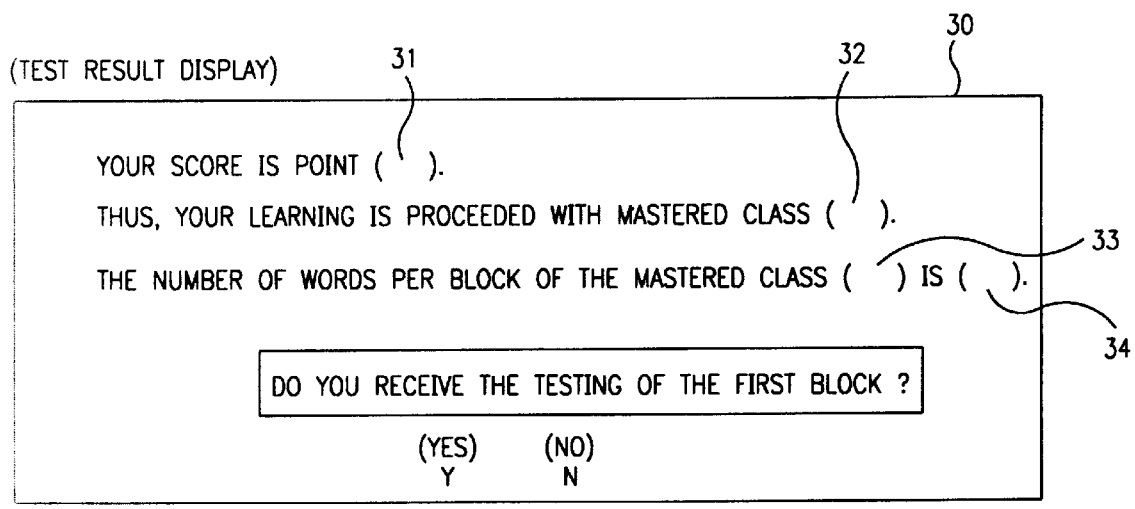

| SCORE | MASTERED CLASS | WORD NUMBER OF ONE BLOCK | ESTIMATION OF UNMASTERY | ACCUMULATED, UNMASTERED WORD NUMBER "THRESHOLD VALUE" | |
|---|---|---|---|---|---|
| 70 ≤ | a | 30 | 9 | 35 ≤ ➤ | 20 WORDS |
| 60 ≤ | b | 25 | 10 | 30 ≤ ➤ | 18 WORDS |
| 50 ≤ | c | 20 | 10 | 25 ≤ ➤ | 15 WORDS |
| 40 ≤ | d | 15 | 9 | 25 ≤ ➤ | 10 WORDS |
| 40 > | e | 10 | 7 | 25 ≤ ➤ | 7 WORDS |

FIG. 17

FIG. 18
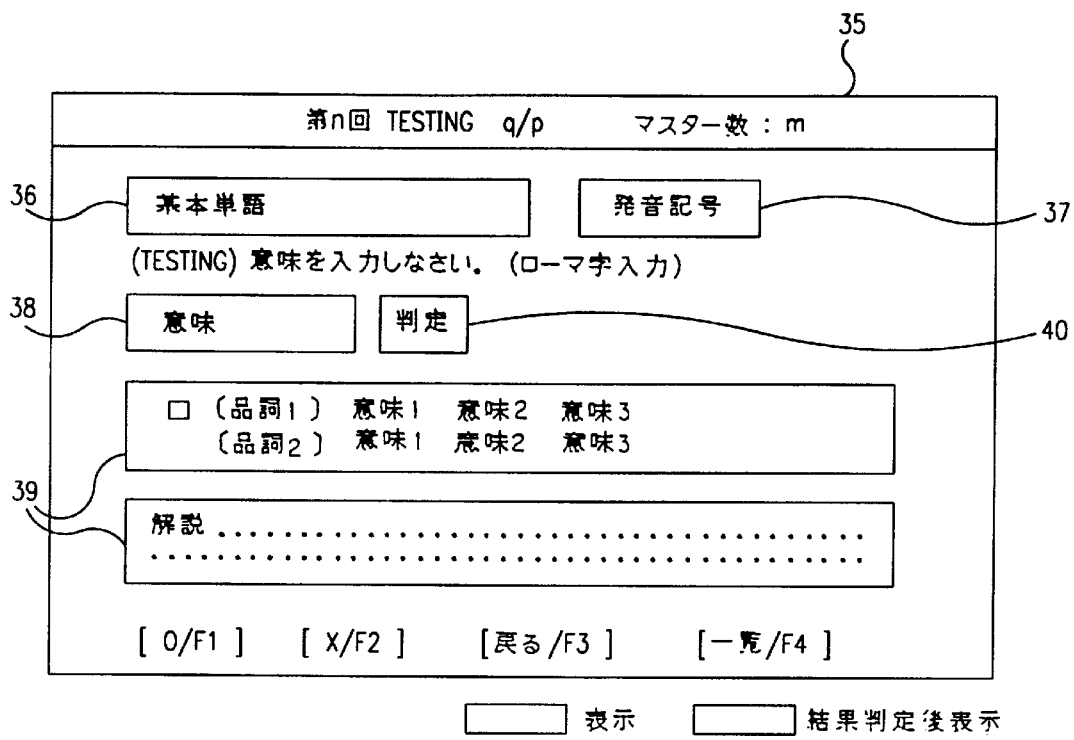
TRANSLATION OF FIG. 18
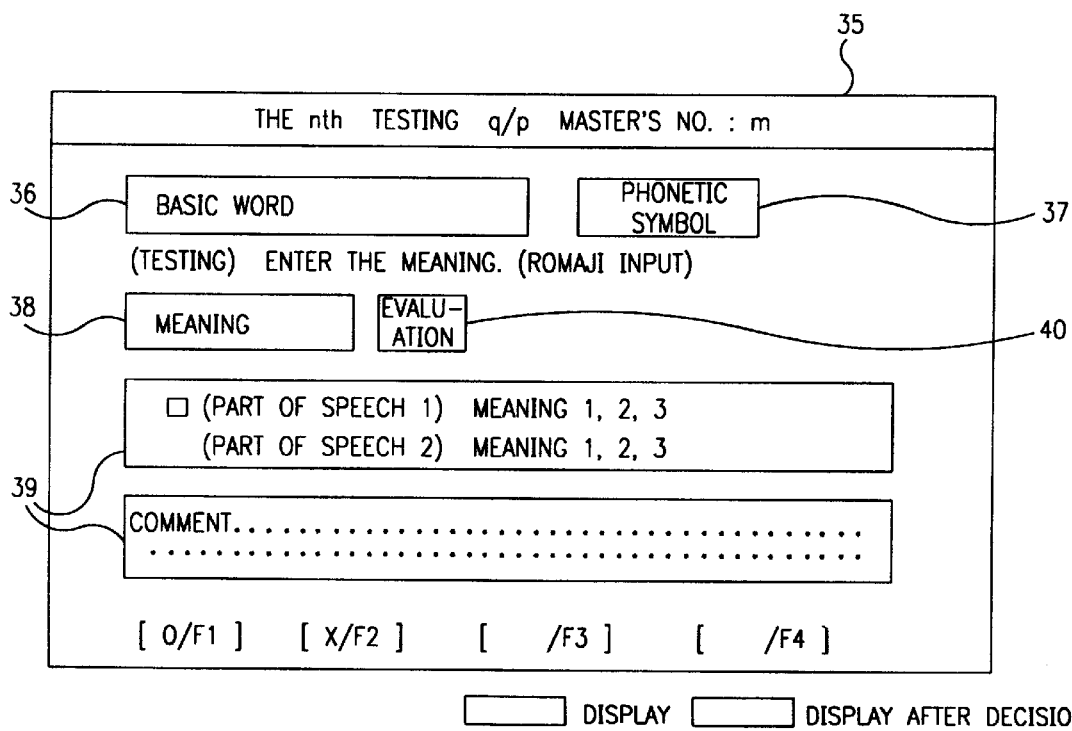

FIG. 19

| 見出し (n単語) | | | | |
|---|---|---|---|---|
| 番号 | 単語 | 発音記号 | 品詞 意味 | ブロック番号-レベル |
| 0001 | experience | (iksp / / / / s) | 〔名〕経験, 休験 | |
| ⋮ | ⋮ | ⋮ | ⋮ | |
| [戻る /F3] | [X/F6] | [O/F7] | [ALL/F8] | [印刷 /F9] |

41

TRANSLATION OF FIG. 19

| HEADLINE (n WORDS) | | | | |
|---|---|---|---|---|
| NO. | WORD | PHONETIC SYMBL | PART OF SPEECH, MEANING | BLOCK NO.-LEVEL |
| 0001 | experience | (iksp / / / / s) | (NOUN) 経験, 休験 | |
| ⋮ | ⋮ | ⋮ | ⋮ | |
| [RETURN/F3] | [X/F6] | [O/F7] | [ALL/F8] | [ /F9] |

桁 → 1 2 3 4 5 6 7 8 9 10 1 2 3 4 5 6 7 8 9 20    7 8 9 0
  ☐☐0001 experience  発音  〔品詞〕意味1, 意味2  01-A

42

TRANSLATION OF FIG. 20

DIGIT → 1 2 3 4 5 6 7 8 9 10 1 2 3 4 5 6 7 8 9 20    7 8 9 0
  ☐☐0001 experience  PHONETIC  (PART OF SPEECH) MEANING 1, 2 01-A
           SYMBOL

```
不得意 LEARNING p/q        マスター数 : n

[単語]   [品詞]   [発音記号] — 46
                 [意味1, 意味2..........] — 47

[解説                                    ]

LEARNING 日本語は英語を、英語は日本語を入力しなさい。
☐ 日本語 _____
☐ 英語   _____
日本語に合うように( )に適切な語を記入しなさい。
☐ 日本語訳 ..................................................
   例文 ................( )..........................
☐ 日本語訳 ..................................................
   例文 ...........(......... )........................
                                              [一覧/F4]
```

TRANSLATION OF FIG. 23

(TRAINING SCREEN OF WORD UNIT)

```
UNFAVORITE LEARNING p/q    MASTERED NUMBER : n

[WORDS]  [PART OF  [PHONETIC] — 46
          SPEECH]  [SYMBOL]
                   [MEANING 1, 2..........] — 47

[COMMENT                                  ]

LEARNING  ENTER JAPANESE FOR ENGLISH OR ENGLISH FOR JAPANESE.
☐ JAPANESE _____
☐ ENGLISH  _____
ENTER PERTINENT JAPANESE INTO PARENTHESIS.
☐ THE JAPANESE VERSION ....................................
   ILLUSTRATIVE SENTENCE........( )..................
☐ THE JAPANESE VERSION ....................................
   ILLUSTRATIVE SENTENCE.....(......... )..............
                                              [   /F4]
```

TRANSLATION OF FIG. 24

```
-- REVIEW --
REVIEW 10 WORDS LEARNED.
ENTER A WORD SUITED FOR THE MEANING.

1. (PART OF SPEECH 1·2)  ◇ MEANING 1 OF PARTS OF SPEECH 1~3  ◇ MEANING 1 OF PARTS OF SPEECH 2
   □ WORD INPUT   EVALUATION   CORRECT ANSWER / DIFFERENT ANSWER 1 / DIFFERENT ANSWER 2

2. (PART OF SPEECH 1·2)  ◇ MEANING 1 OF PARTS OF SPEECH 1~3  ◇ MEANING 1 OF PARTS OF SPEECH 2
   □ WORD INPUT   EVALUATION   CORRECT ANSWER / DIFFERENT ANSWER 1 / DIFFERENT ANSWER 2

3. (PART OF SPEECH 1·2)  ◇ MEANING 1 OF PARTS OF SPEECH 1~3  ◇ MEANING 1 OF PARTS OF SPEECH 2
   □ WORD INPUT   EVALUATION   CORRECT ANSWER / DIFFERENT ANSWER 1 / DIFFERENT ANSWER 2

4. (PART OF SPEECH 1·2)  ◇ MEANING 1 OF PARTS OF SPEECH 1~3  ◇ MEANING 1 OF PARTS OF SPEECH 2
   □ WORD INPUT   EVALUATION   CORRECT ANSWER / DIFFERENT ANSWER 1 / DIFFERENT ANSWER 2
```

| n回目 完全記憶 TRAINING(a) p/q | マスター数 : m |

| 単語 | | 発音記号 |

[TESTING] 意味を入力しなさい。(ローマ字入力)

意味 ____ | 判定 | ～50

☐ 品詞1 意味1／意味2／意味3
　品詞2 意味1／意味2／意味3

解説 ．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．

[O/F1]　　　[X/F2]　　　　　　　　　[一覧/F4]

51

TRANSLATION OF FIG. 27

<FORM 1> 49

| nth TRAINING OF FULL MEMORIZATION(a) p/q   NO. OF MASTERED WORDS : m |

| WORD | | PHONETIC SYMBOL |

[TESTING] ENTER THE MEANING. (INPUT IN ROMAJI)

MEANING ____ | EVALU-ATION | ～50

PART OF SPEECH 1　　MEANING 1 / MEANING 2 / MEANING 3
PART OF SPEECH 2　　MEANING 1 / MEANING 2 / MEANING 3

COMMENT．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．．

[O/F1]　　　[X/F2]　　　　　　　　　[ /F4]

51

FIG. 28
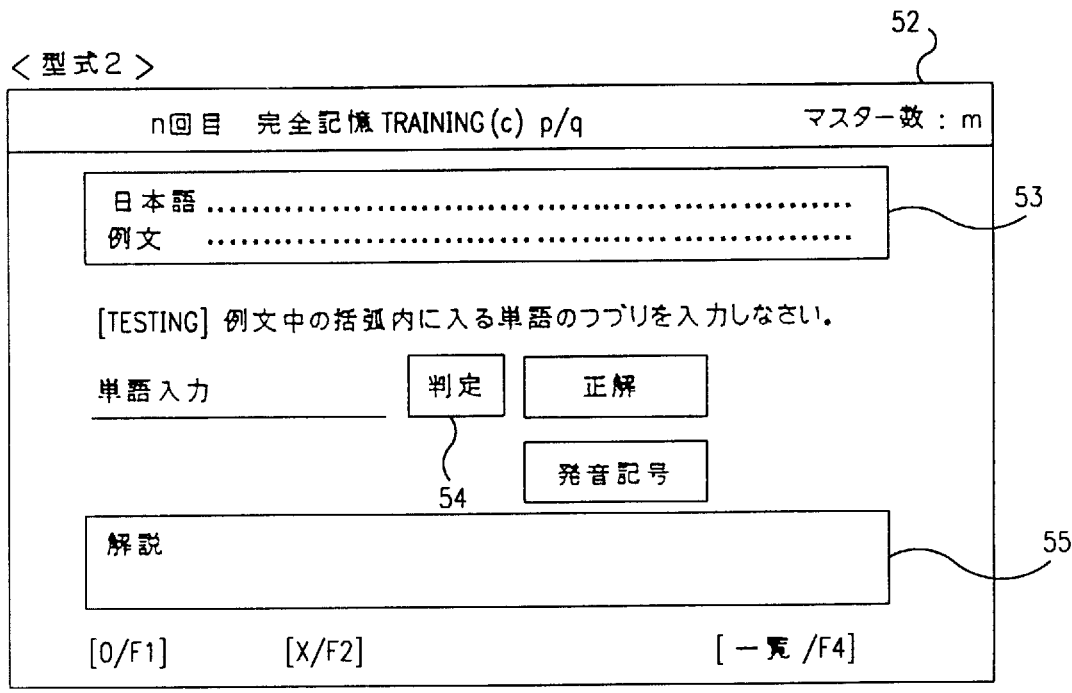
TRANSLATION OF FIG. 28
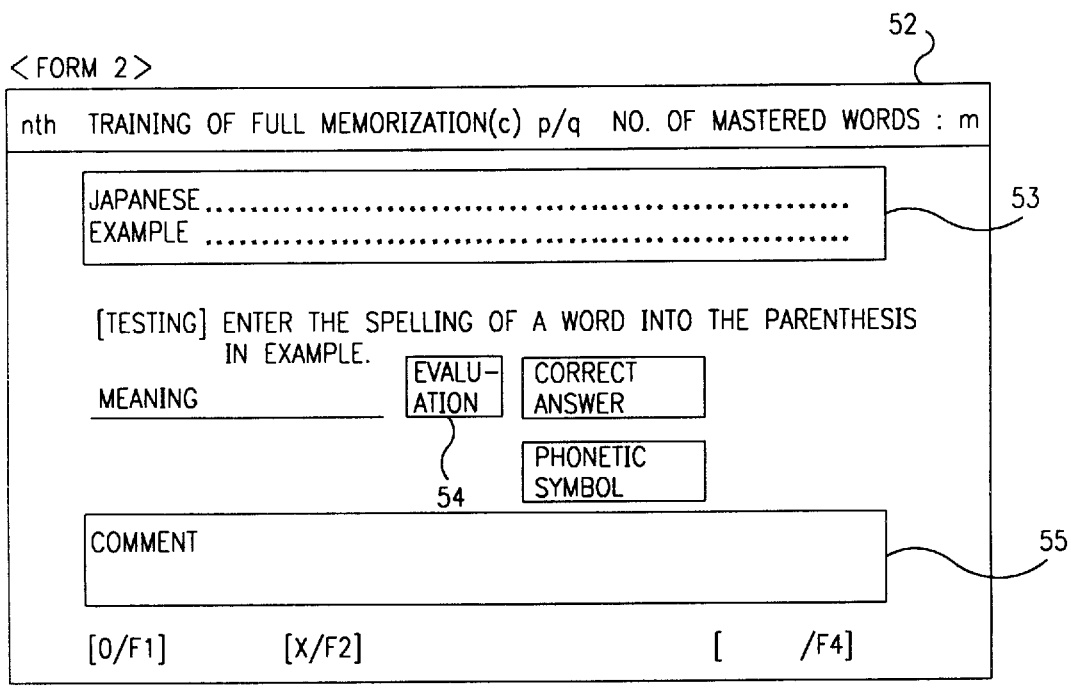

FIG. 29
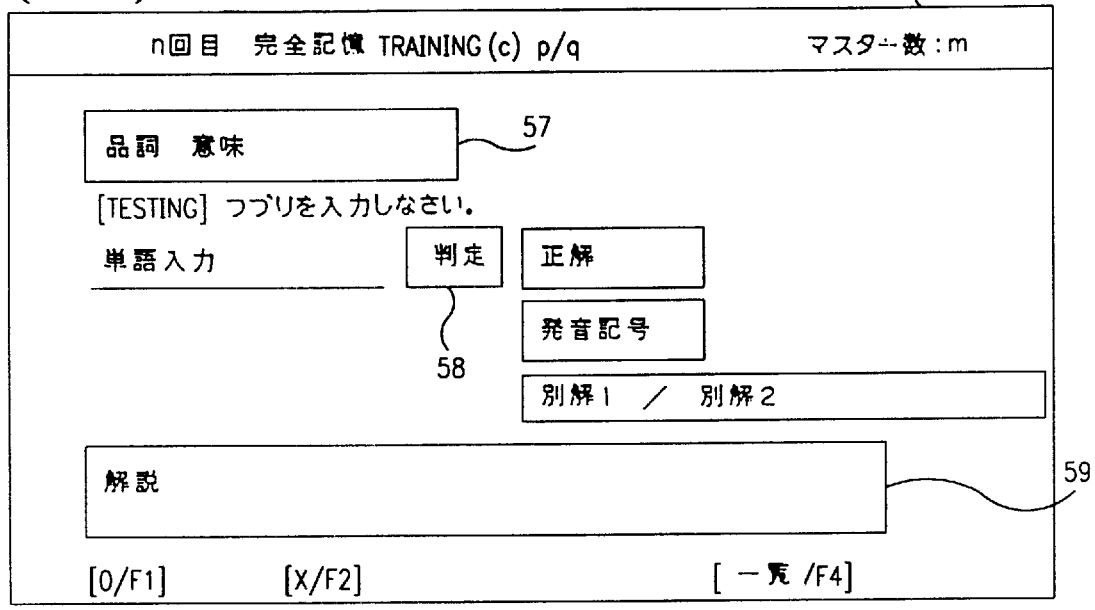
TRANSLATION OF FIG. 29
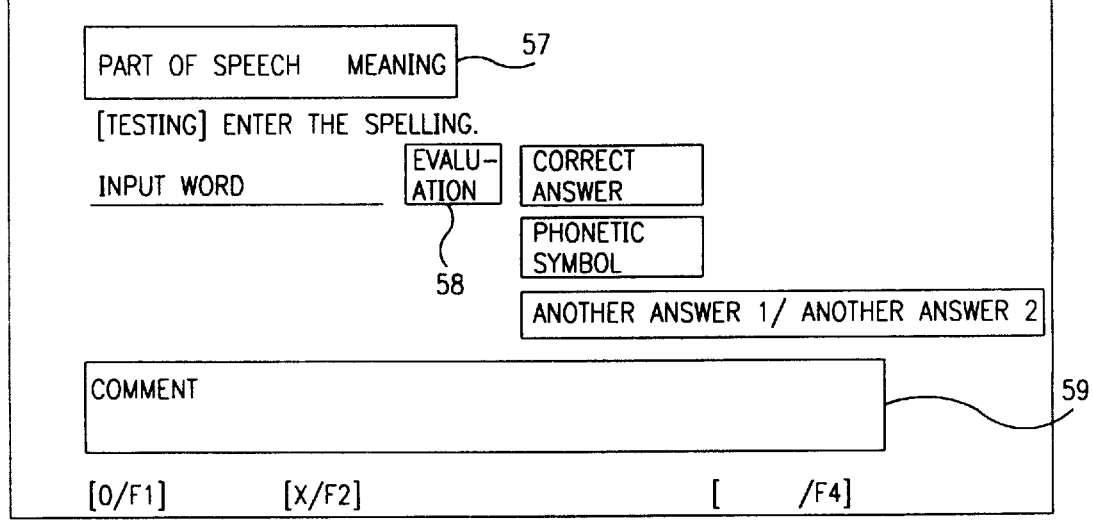

(YES) (NO)
Y      N

TRANSLATION OF FIG. 30

YOU HAVE FINISHED 1200 WORDS. STICKED WELL !

YOUR LINGUISTIC KNOWLEDGE IS CLOSE TO PERFECTION, BUT
THE ONCE MISTAKEN WORDS ARE LIABLE TO BE FORGETFULL IN TIME.

THEN, YOU CAN MAKE THE ENTIRE REVIEW OF THE ONCE
MISTAKEN WORDS AS THE TARGET. IT IS THE SAME AS
THE METHOD DONE SO FAR.
YOUR TARGET WORD IS ( ).

(YES) (NO)
Y      N

FIG. 31
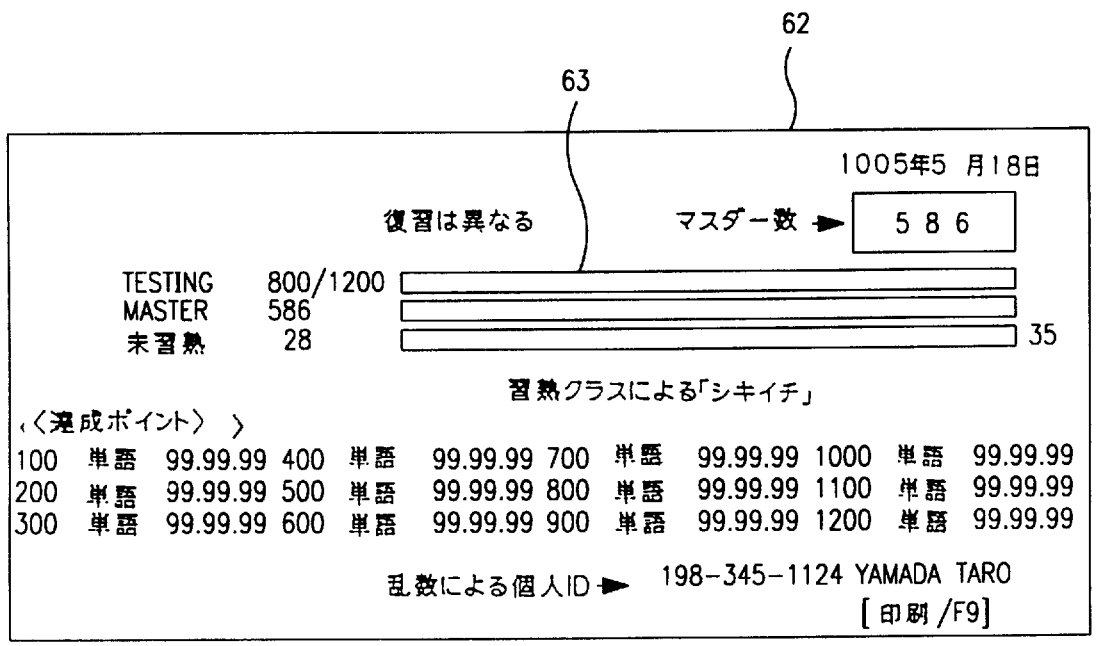
TRANSLATION OF FIG. 31
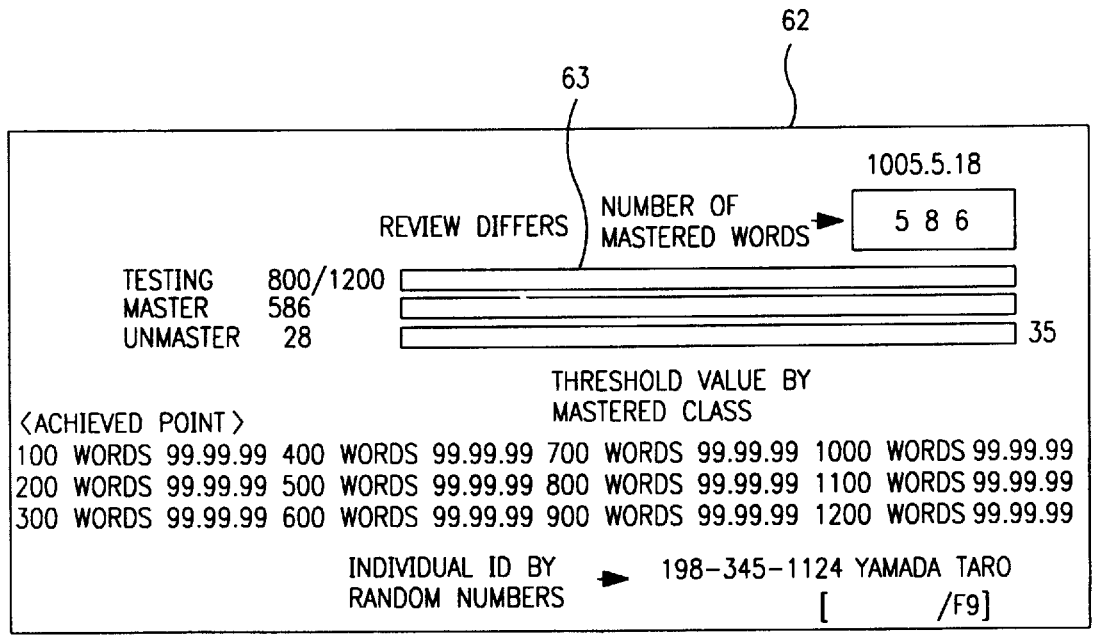

FIG. 32
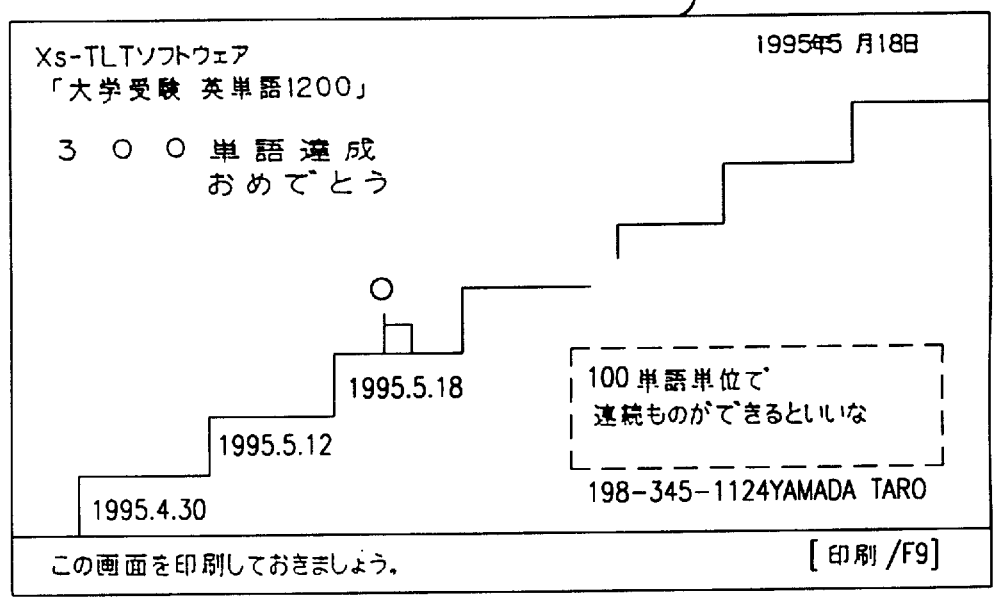
TRANSLATION OF FIG. 32
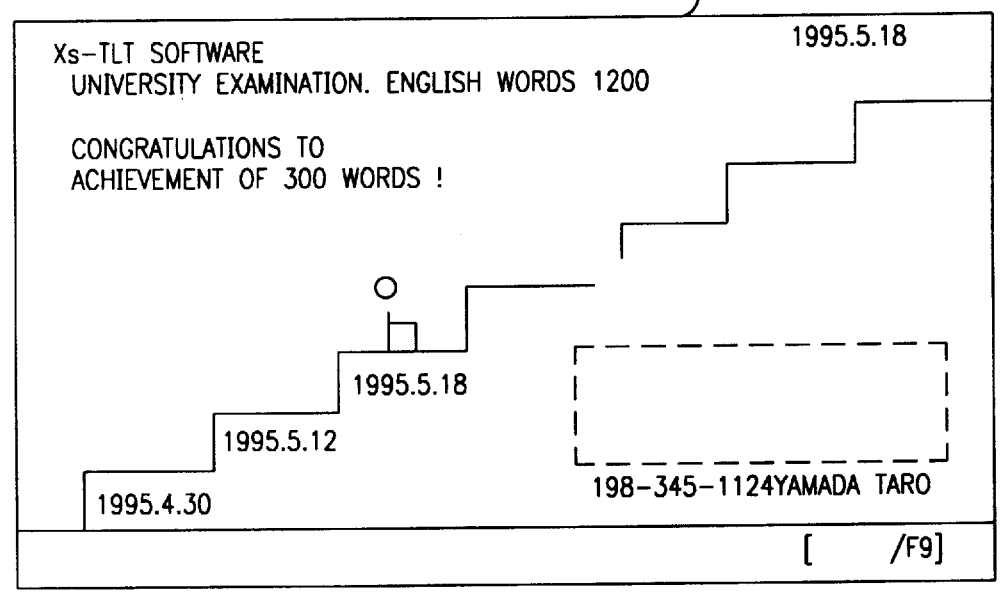

LEARNING APPARATUS

This is a continuation of application Ser. No. 08/597,027, filed Feb. 5, 1996, abandoned.

FIELD OF THE INVENTION

The present invention relates to a teaching device, and more particularly, to a device for teaching language skills using a computer, a display and a manually controlled input device.

BACKGROUND OF THE INVENTION

For example, when learning English words or phrases, an English-Japanese dictionary or a language book is used. However, too many words or phrases are listed on each page of such a dictionary or book and thus learners tend to loose their memorizing desires.

With the advance of semiconductor technology, it has recently become feasible to provide a mass storage device, and an electronic dictionary has been put to practical use. Such device has a liquid crystal display and a variety of keys such as English-Japanese/Japanese-English mode keys, alphabet keys (A–Z) in English, kana keys from A to NN, sonant key, capital/small letter selector keys, word/phrase selector keys, search key, translation key, etc.

For example, when the spelling of English words and the Japanese translation are learned, English words are displayed on the liquid crystal display by setting an English-Japanese mode and using the English letter keys. Then, when the translation key is pushed on, while imagining the meaning of the English word, the English word is replaced on the display by Japanese word. In accordance with the Japanese word on the display, one can judge whether his memory is correct or not.

In this device, only words or sentences which he wants to learn are successively displayed on the liquid crystal display so that he may learn them with pleasure and never get tired of the learning.

However, in such a conventional device, only the translated Japanese word versus the input English word, or vice versa is alternately displayed, and thus it does not have the effectiveness to promote the learner's retentive power. Furthermore, the learner has to judge whether the memory is correct or not, and thus it can not exactly evaluate the mastered level in learning. In addition, among the English words displayed on the display, there are words which the learner has already memorized, so that the learning time becomes long.

Accordingly, it is an object of the present invention to provide a teaching device by which one can learn languages at one's level, the evaluation of having learned languages can be made at a learning process, and one can learn words or phrases which have not been memorized, so that the learning efficiency is highly improved.

According to the invention, a teaching device, comprises:
a display for displaying questions of a teaching subject and answers to the questions by a learner;
means for testing the learner to discriminate correct and incorrect answers among the answers to questions, the learner being tested by a predetermined number of the questions per one teaching block dependent on a level of the learner on the teaching subject;
means for repeatedly teaching correct answers on the incorrect answers to the learner;
means for determining a level of the learner on each of the questions per the teaching block; and
means for removing a question of the level of the learner higher than a predetermined level from the questions per the teaching block for the repeatedly teaching means.

BRIEF DESCRIPTION OF THE DRAWINGS

The invention will be explained in more detail in conjunction with appended drawings, wherein:

FIG. 9 is an image showing the content on a display at the time of check test;

FIG. 10 is a view showing an image or a display in selecting whether or not a mastered class should be tested by a software;

FIG. 11 is a view showing an image in the case of carrying out no test of a mastered class by a software;

FIG. 12 is a view showing an image in the case of carrying out no test of a mastered class by a software;

FIG. 13 is an image on the display showing the content to decide a mastered class during the test;

FIG. 14 is a schematic diagram showing the words for testing and the construction of data relating thereto;

FIG. 15 is an image showing the content on the display after the completion of the test to decide a mastered class;

FIG. 17 is a table showing the modification of the number of words in one block when the accumulated unmastered words have the following relation:

threshold value ≦ accumulated unmastered words.

Figure 1:
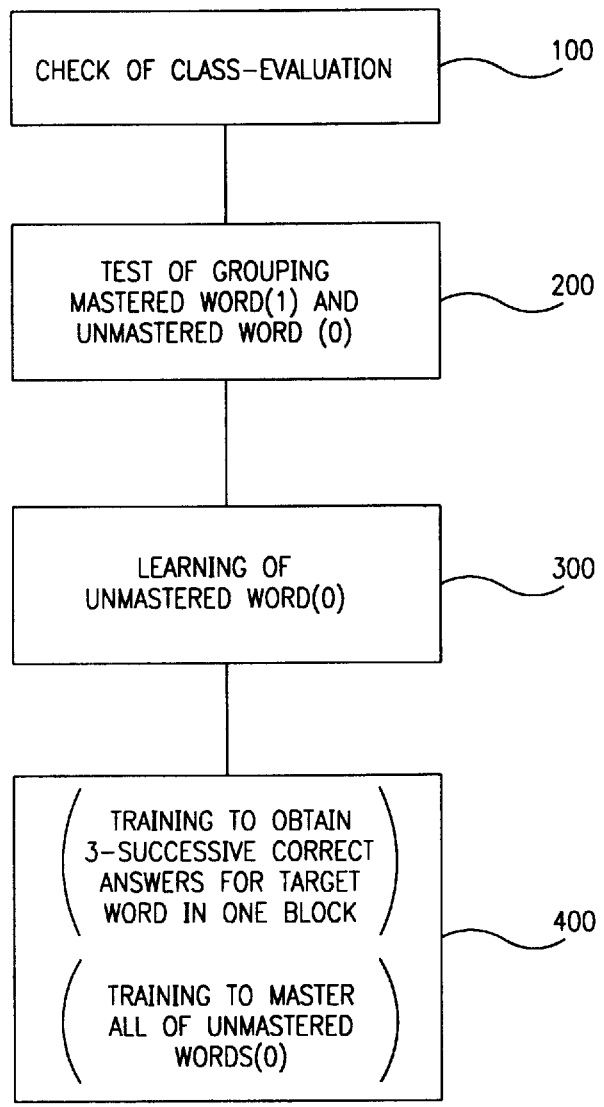
FIG. 1 is a flow chart showing the overall process by a teaching device of the present invention.
Figure 21:
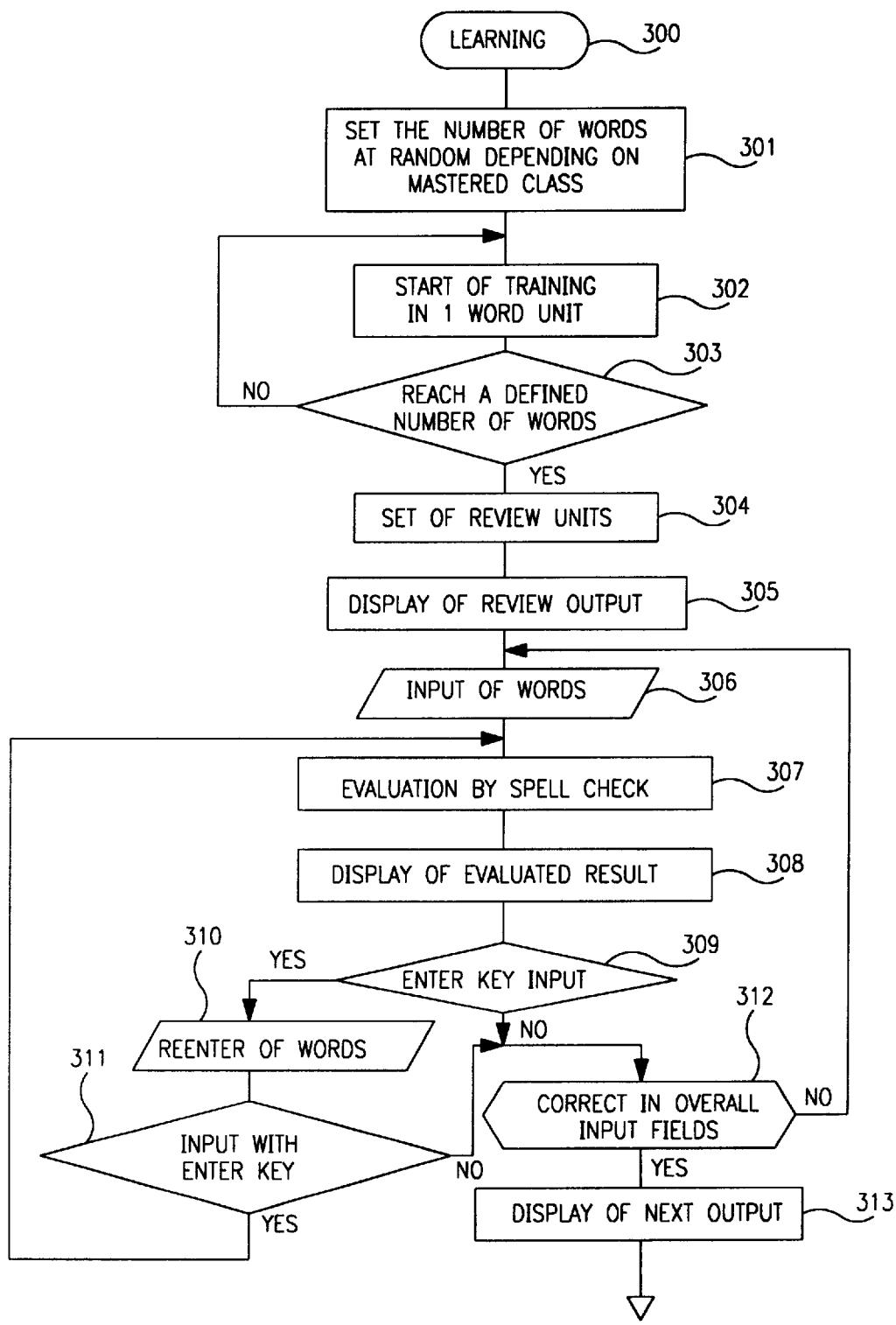
Figure 22:
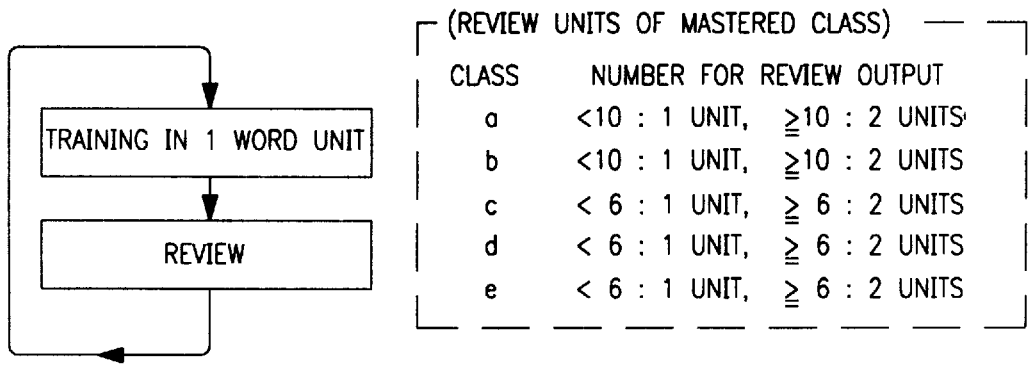
Figure 26:
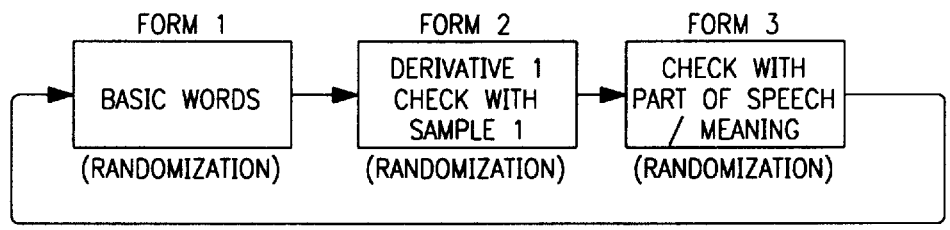
Figure 25:
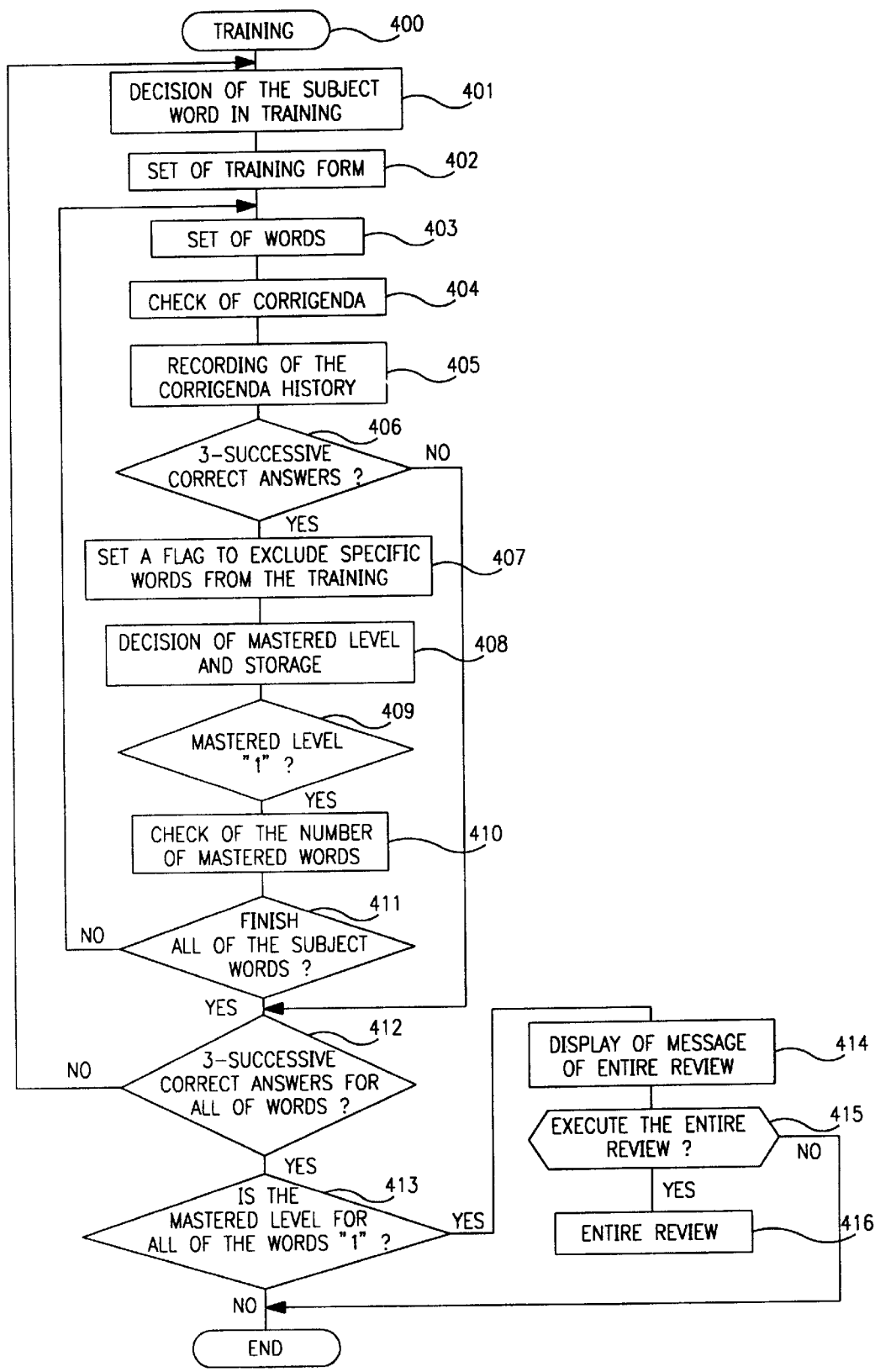

FIG. 18 is an image of the content displayed on a display at the time of the testing process;

FIG. 19 is an image of the content displayed on a display when the designation of a sight is effected at the time of display shown in FIG. 18;

FIG. 20 is a schematic diagram showing a printing image in the state shown in FIG. 19;

FIG. 21 is a flow chart showing the details of the process of the testing in the step 300 shown in FIG. 1;

FIG. 22 is a flow chart showing an outline of the processing during the process of practice;

FIG. 23 is an image on a display showing the content of training for a word unit in the process of practice;

FIG. 24 is an image on a display showing the content of a review process continued after the process shown in FIG. 23;

FIG. 25 is a flow chart showing the details of the training process of the step 400 shown in FIG. 1;

FIG. 26 is a flow chart showing an outline of the training process;

FIG. 27 is an image on a display showing the content displayed at the time of the training of fundamental words in the training process;

FIG. 28 is an image on a display showing the content displayed at the time of the training of derivatives in the training process;

FIG. 29 is an image on a display showing the content displayed at the time of the training of a part of speech/meaning;

FIG. 30 is an image on a display showing the selective guide of the entire review when the mastered level of the overall words became "1" in the training process;

FIG. 31 is an image on a display showing the content of a table for administration of the advanced degree according to the present invention; and FIG. 32 is an image on a display displayed when a predetermined number of words are mastered.

DESCRIPTION OF THE PREFERRED EMBODIMENTS

Referring now to the drawings, the preferred embodiments according to the present invention will be described hereinafter.

Figure 2:
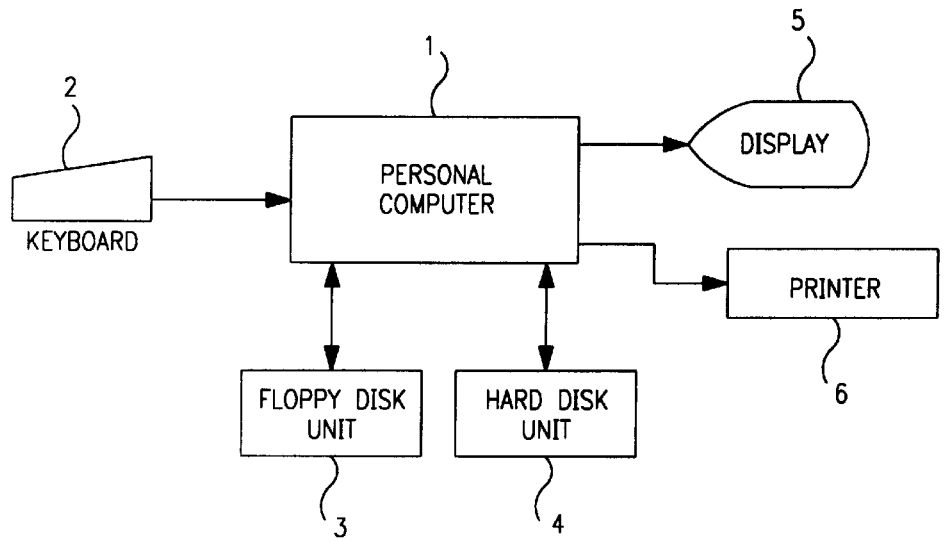
FIG. 2 is a block diagram showing the construction of a teaching device according to the present invention.

FIG. 1 is a flow chart showing the entire process of a teaching device according to the present invention, and FIG. 2 is a block diagram showing the construction of the teaching device.

The teaching device of the present invention comprises a personal computer 1, a keyboard 2 connected to the personal computer 1, a floppy disk unit 3, a hard disk unit 4, a display 5 and a printer 6. The software according to the present invention is stored in a floppy disk, and this floppy disk is loaded into the floppy disk unit 3, thereby operating the personal computer 1. The program may be stored on the semiconductor memory such as ROM and the like, instead of the floppy disk.

Figure 3:
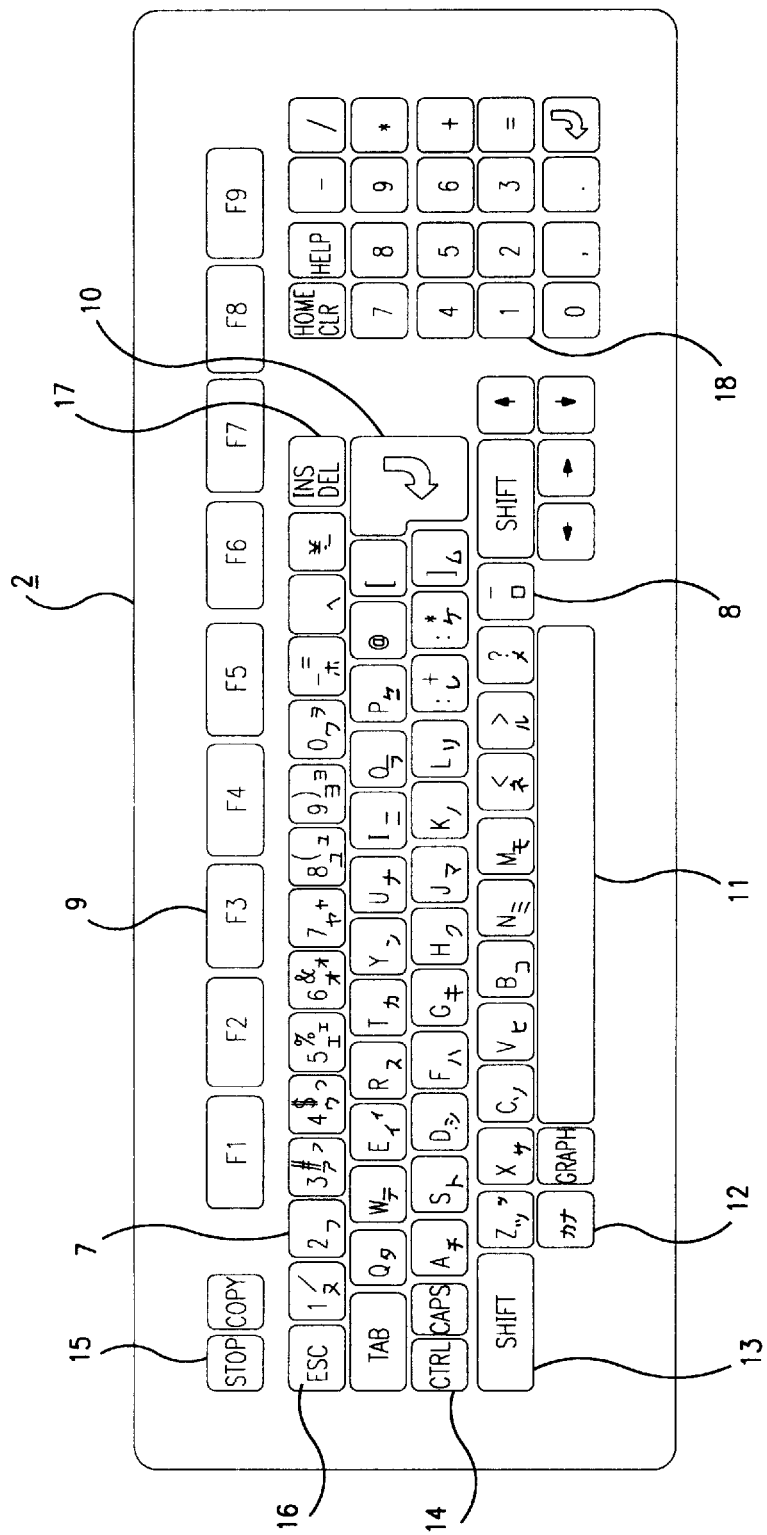
FIG. 3 is a plan view showing one example of key boards.

As shown in FIG. 3, the keyboard 2, called a JIS key-arrangement keyboard, comprises the numeral/kana/sign keys 7 arranged in a line, the alphabet/kana/sign keys 8 arranged in three lines, nine function keys 9 (F1–F9) arranged in a line, an input or enter key 10, a space key 11, a kana-mode key 12, a shift key 13 (SHIFT), a control key 14 (CTRL), a stop key 15 (STOP), an escape key 16 (ESC), an insert/delete key 17 (INS/DEL), ten keys 18, etc.

The F1 and F2 keys of the function keys 9 are used as substitutes for the o and x keys corresponding to a correct answer or error, respectively, for example, in the automatic evaluation upon testing. The other function keys are used to execute respective specified intrinsic matters.

The content of the floppy disk read by the floppy disk unit 3 is written into a hard disk (not shown) of the hard disk unit 4 by the personal computer 1, and then the processes set forth on a flow chart are executed at a high speed by the personal computer 1 using the hard disk. The display 5 using a high definition color CRT or a liquid crystal display (LCD) is used to display input data, processed data or printout data. The printer 6 such as an ink-jet printer and the like is used to print a displayed content at the time of test, an advanced degree administration, an achieved point and the like.

The floppy disk loaded into the floppy disk unit 3 has the content indicated on the flow chart shown in FIG. 1. The case where English words are learned as a learning subject will hereinafter be described in the preferred embodiments. However, the present invention is not limited to the learning of languages such as the English words and the like, but it can also be used for other learning subjects such as the date and incidents of history, the chemical elements and their symbols, chemical formulas and their designations, etc. as well as learning of the subjects such as the physical training, arts, music art by combining an illustration with a writing.

As shown in FIG. 1, it is first evaluated what level a learner has for deciding his class(step 100: check test). The method of the evaluation comprises the steps of successively displaying a certain number of words for the questions on a display automatically and entering the answers to the questions in Roman letters by the learner.

In order to select a class corresponding to the ability of a learner, the learner enters answers to questions of plural classes, among which all answers are correct in the lowest class, and all answers are incorrect in the highest class. If a selected class is appropriate for the learner, the learning and training can be efficiently and effectively carried out. The details of process in this step 100 will hereinafter be described referring another flow chart.

In this check test, the word correctly answered by a learner is defined as "mastered word" and when he has mastered this, the learner is defined as having the mastered level "1". The word incorrectly answered or not answered by the learner is defined as "unmastered word" and the learner is defined as having the mastered level "0".

When the learner is a school student and his language ability is already grasped in a school by a teacher, the class can be entered from the keyboard 2 without operating the step 101. In this way, the evaluation of the class becomes unnecessary and thus the learner can start the learning at once.

In step 200, the number of words per block (one practice unit) is decided by considering the mastered class decided on the check test in step 100 and the number of the unmastered words accumulated, and the words of the decided number are successively displayed on the display 5. The learner enters the answers with keys by watching the display. The results for the input answers are evaluated to be "1" or "0" by the personal computer 1, and the mastered class is finally decided.

After the test in step 200, only the unmastered words (the words of level "0") are displayed on the display (step 300). The already memorized words are deleted in this learning process, and thus only the learner can efficiently learn or memorize them.

Then, the training is continued until all the unmastered words become the mastered level "1" (step 400). Before reaching the mastered level "1", there are two mastered levels "A" and "B". The mastered level "A" refers to a faint memory state. The absolutely unmastered level (scarecely memorized state) is defined as the mastered level "B". The learning is continued until all the unmastered words become the mastered level "1" unless the learning is given up by the learner.

Figure 4:
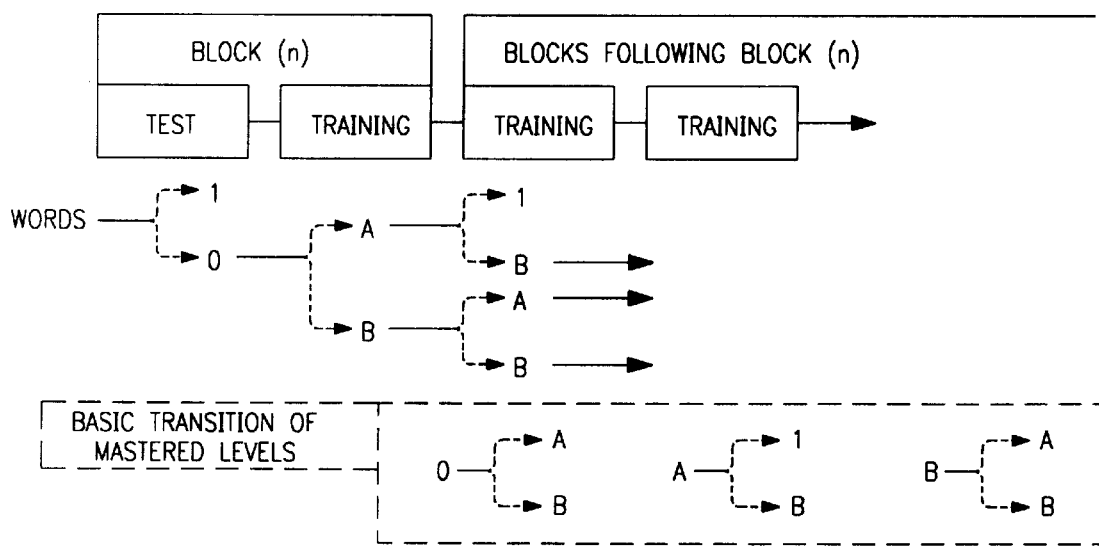
FIG. 4 is a schematic diagrams showing the state in which a level is improved with the learning or training according to the present invention.

The mastered level "0" is changed depending on the proceeding state in learning or training as shown in FIG. 4. That is, the mastered level "0" in the testing step is shifted to the mastered level "A" or "B" from time to time. The mastered level "A" is also shifted to the mastered level "1" or "B", and the mastered level "B" remains unchanged or is shifted to the mastered level "A". A group of the words at the respective mastered levels "0", "A" and "B" is defined as accumulated unmastered words herein.

In the process of the training, when correct answers are obtained three consecutive times at the stage of mastered level "0", it is changed to the mastered level "A", while when correct answers are not obtained three consecutive times, it is changed to the mastered level "B". When the block number to decide the situation of a specific word in the mastered level "B " (the block number at the time of decision of the mastered level) corresponds to "the present block number-2", if correct answers are obtained three consecutive times from the first time, the level "B" is changed to the level "A" and if correct answers are not obtained three consecutive times, the level "B" remains unchanged.

When the block number to decide the situation of a specific word in the mastered level "B" corresponds to "the present block number-4", if correct answers are obtained three consecutive times from the first time, the level "A" is changed to the level "1" and if correct answers are not obtained three consecutive times, the level "A" is changed to the level "B". In this way, it is possible to memorize a faint memorized word by frequently displaying it on a display, and an unmemorized word by displaying it on a display at long intervals.

Figure 5:
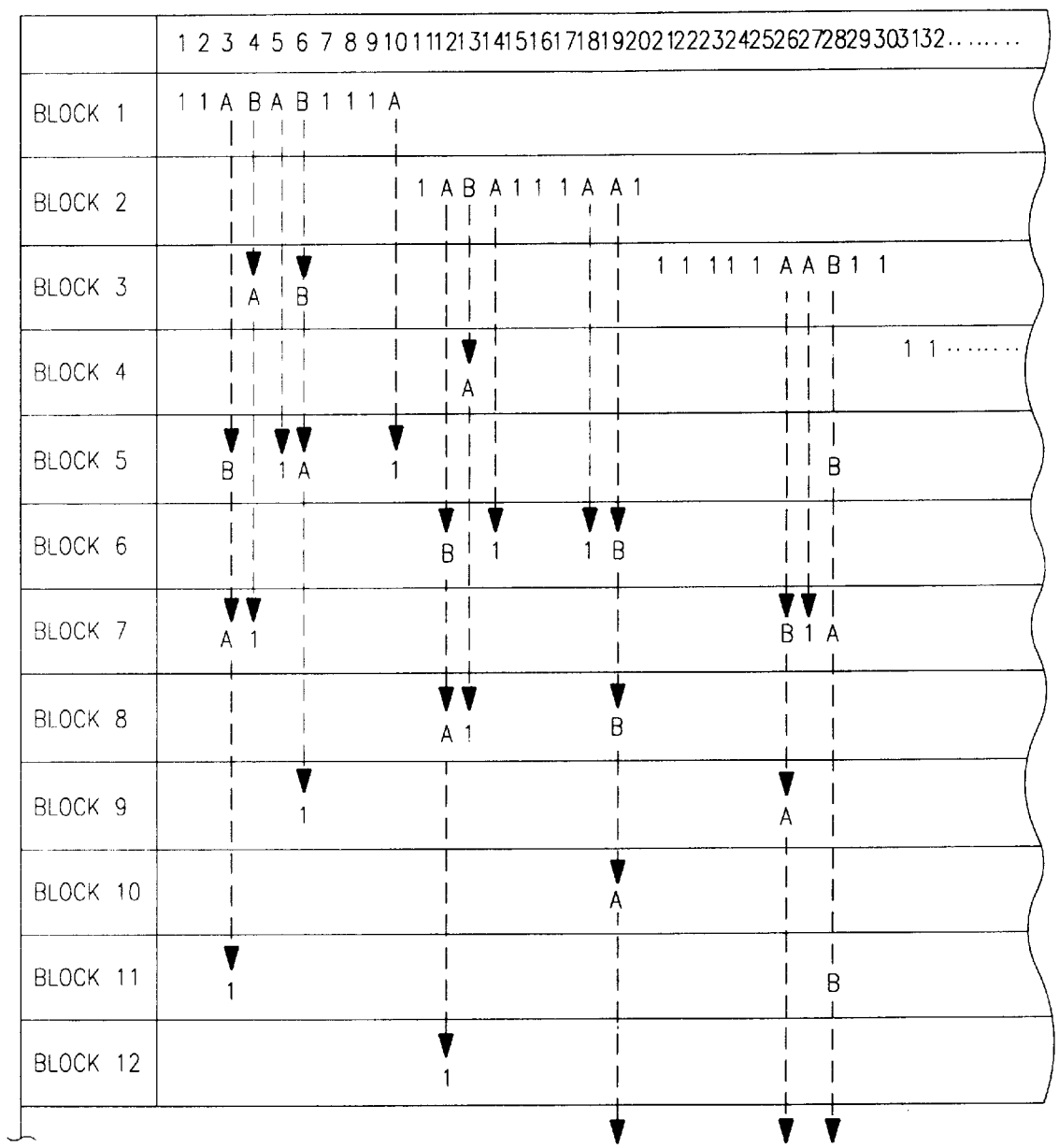
FIG. 5 is a schematic diagram showing the relation between the subject of the training and the learner's level in the course of the training according to the present invention.

FIG. 5 shows the transitions of training subjects and mastered levels in a training process. Herein, one block consists of ten words, and the same word or phrase is not involved in the same block. As shown in FIG. 5, block 1 has the word numbers 1–10, and when the mastered level is "11ABAB11A", a learner has to practice the words of the mastered levels "A" and "B". With respect to the words of the level "A", they are again practiced at the time of four blocks after the block 1, and they are practiced several times until they become level "1", and when some of them become level "B" they are again practiced two blocks thereafter.

With respect to the words of the level "B", they are again practiced two blocks thereafter and they are practiced several times until they become level "1". The words which became the level "1" are deleted from the training subjects, and thus the number of words to be practiced is gradually reduced. Consequently, the teaching device of the present invention has the characteristics that the learners can realize a low load with the progress of training or learning and their learning desires can be increased.

Figure 6:
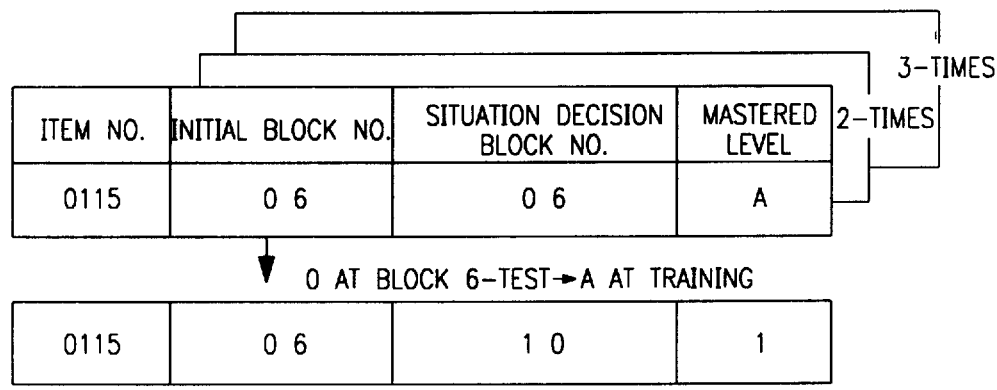
FIG. 6 is a schematic diagram showing the relation between the administration table for words and the learner's level.

FIG. 6 shows the relationship between a word administration table and the mastered level. FIG. 6 shows the case where the item number (that is, word number) is "115" wherein the initial block number is "06", the block number to evaluate the mastered level (the situation decided number) is "6", and the mastered level evaluated at that time is "A", and it means that correct answers are obtained three consecutive times. The lower column shows that the training is again executed at "block 10" thereafter due to the mastered level "A", and the mastered level become "1" at this block 10.

When the processes shown in FIG. 1 are started by a mastered class having 20 words per block, the test and learning processes for 1,000 words can be completed with "about" 50 and several blocks, but the training process exists still more even if such test and learning processes were completed. The reason for using the term "about" herein is for the purpose of automatically limiting the word number in one block test when the number of accumulated unmastered words exceeds a predetermined number in the process of learning. For example, when the learning process is stated with 30 words per block and the accumulated unmastered words exceeds 30, the word number for one block test is limited to 15 at that time.

Figure 7:
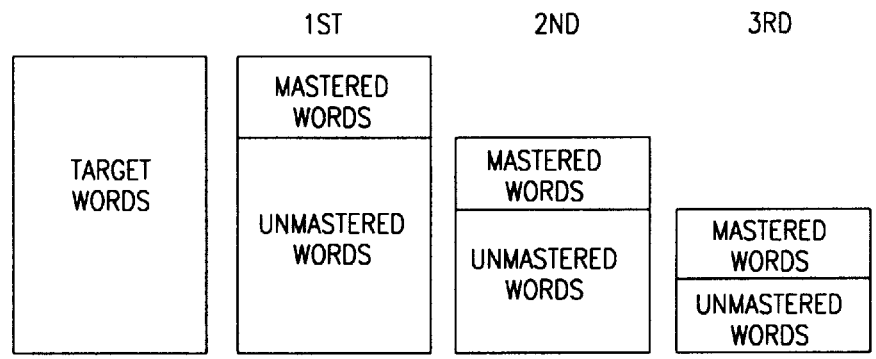
FIG. 7 is a schematic diagram showing the number of practices in the present invention.

FIG. 7 is a schematic diagram showing the number of the learning times. After all of the words have been evaluated to be mastered, the process of the learning of the words once decided as unmastered can again be executed three times. As shown in FIG. 4, the words are divided into a mastered word (mastered level "1" and an unmastered word (mastered level "0") and the learning is then limited to only an unmastered word. In the second test stage, the words which became the mastered level "1" in the first test stage are then excluded from the learning and thus the number of words is decreased. Similarly, the words which became the mastered level "1" in the second test stage are also excluded from the next learning and thus the number of the words is further decreased. It is also possible to select the method of repeating only the second test stage several times. Further, after the first test stage has been completed, it is also possible to carry out a time trial in which only the test of all words is repeated several times. Thus, it is possible to check the number of words memorized at the present time and measure the time required, and thus the learner can enjoy the practice with a game sense.

Next, referring to FIGS. 8, 16, 21 and 25 , the steps 100, 200, 300 and 400 will be described in detail.

Figure 8:
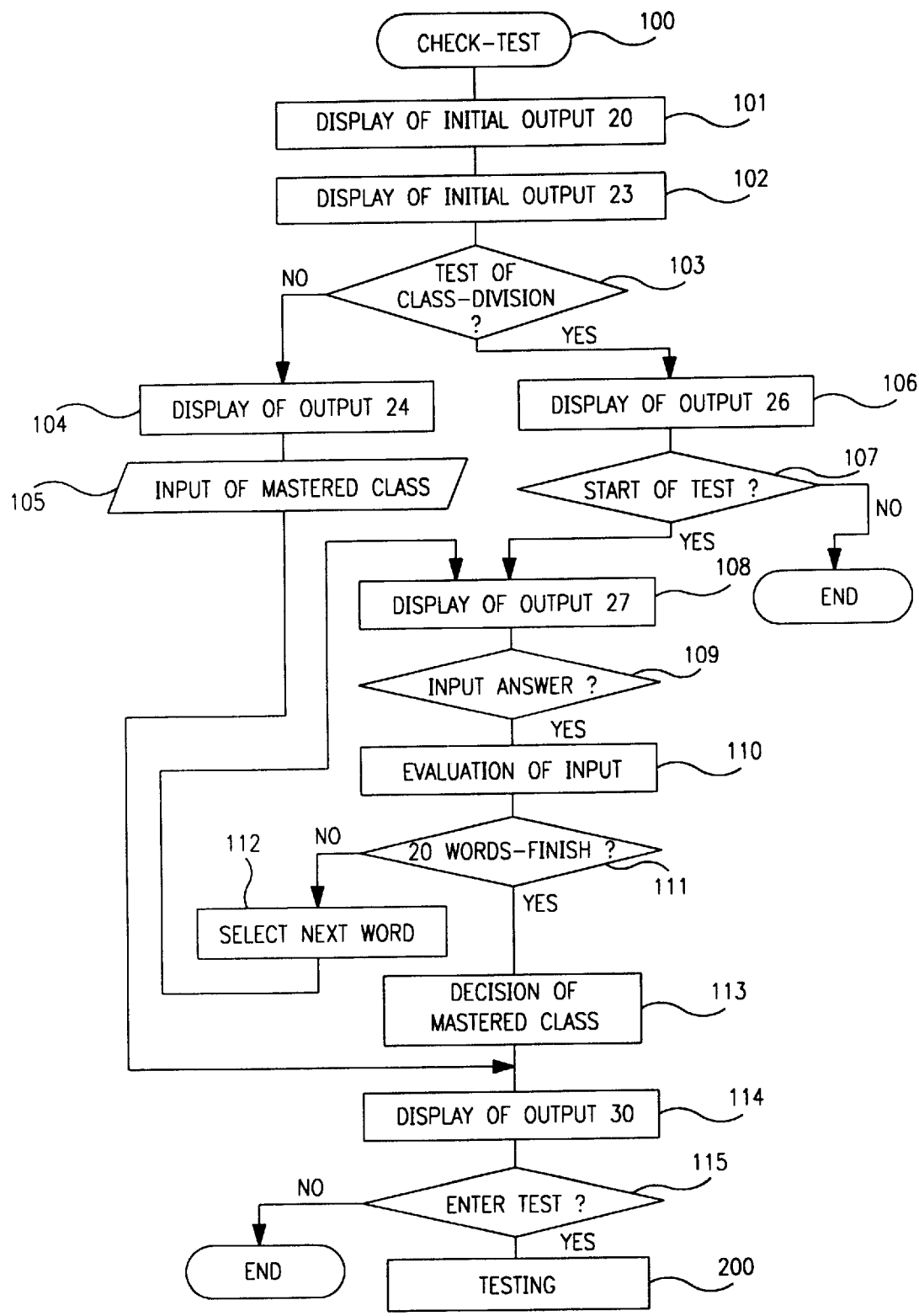
FIG. 8 is a flow chart showing the detailed process of the check test in the step 100 shown in FIG. 1.

FIG. 8 is a flow chart showing the detailed process of the check test in step 100 shown in FIG. 1. In this check test, the content 20 shown in FIG. 9 is first displayed on the display 5(step 101). The learner operates a keyboard 2 to enter his name into a frame 21 in romaji. The content is then changed as shown in FIG. 10, wherein the content 23 provides the learner with a question whether or not to decide a mastered class (one of five ranks of a, b, c, d, and e) by the test (step 102). For this content, the learner operates Y key or N key in the alphabet/kana/symbol keys 8 to select one of the mastered classes (step 103).

Figure 11:
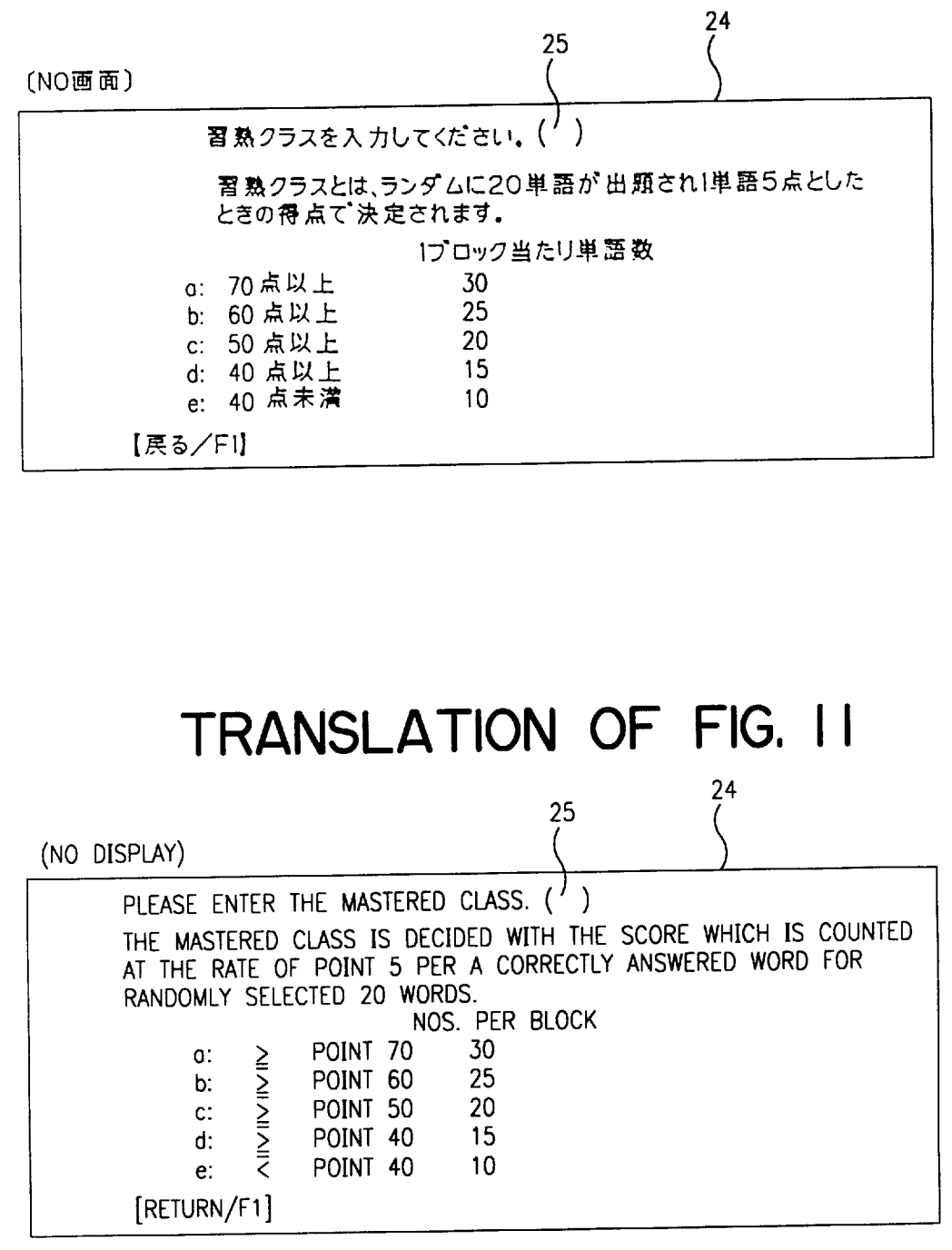

For example, when the N key is pushed on and ENTER key 10 is push on (step 105), the content 24 shown in FIG. 11 is displayed on the display (step 104). Seeing this content, the learner self-declares one of the mastered classes by entering one of alphabet letters (a–e) with the corresponding key of the keyboard 2 (step 5). This input is displayed in a mastered class display frame 25 on the display 5. When Y key is pushed on and ENTER key 10 is pushed on, the content 26 is displayed as shown in FIG. 12, displaying a message whether or not asking to start the test (step 107).

Then, the learner operates the Y key (on demand of start of the test) or N key (on demand of stop of the test) on the keyboard 2. When the Y key is pushed on, the content shown in FIG. 13 is displayed on the display 5 (step 108). The learner operates the kana keys on the keyboard 2 to enter the meaning of the word (romaji translation), thereby displaying the meaning in a meaning display frame 28. The personal computer 1 evaluates the results (correct or incorrect) (step 110) to display it in an evaluation display frame 29. When the result displayed in the frame 29 is unsatisfactory, the learner operates F1 or F2 key of the function keys 9 to modify it. Twenty words are successively displayed by a random sampling method. This is, the words are displayed one by one on the display 5 to test the learner. The words and their related data are shown in FIG. 14.

The word on the display 5 shown in FIG. 13 is replaced each input of the meaning of the word (step 112) and the operation is repeated, When the number of words reaches 20(step 111), his mastered class is decided on the basis of the results of the correct and incorrect answers (step 113). As displayed by the content 24, one of the classes a–e is decided on the basis of the correct answers and the number of word per block is decided corresponding to the scores.

The relations between each of the mastered classes and the number of words per block are as follows:

> mastered class a = 30 words,
> mastered class b = 25 words
> mastered class c = 20 words,
> mastered class d = 15 words
> mastered class e = 10 words, The results of the mastered classes evaluated are displayed on the display 5 (step 114). The processing in this step 114 is also displayed after the end of the processing in step 105.

The result or score is displayed in a score display frame 31 on the content 30, as shown in FIG. 15, wherein one of alphabets is displayed in a class display frames 32 and 33, and the number of the words per block is displayed in a word display frame 34. Finally, the learner operates Y or N key on the keyboard 2 to input whether or not to enter into the test process in step 200 (step 115).

Figure 16:
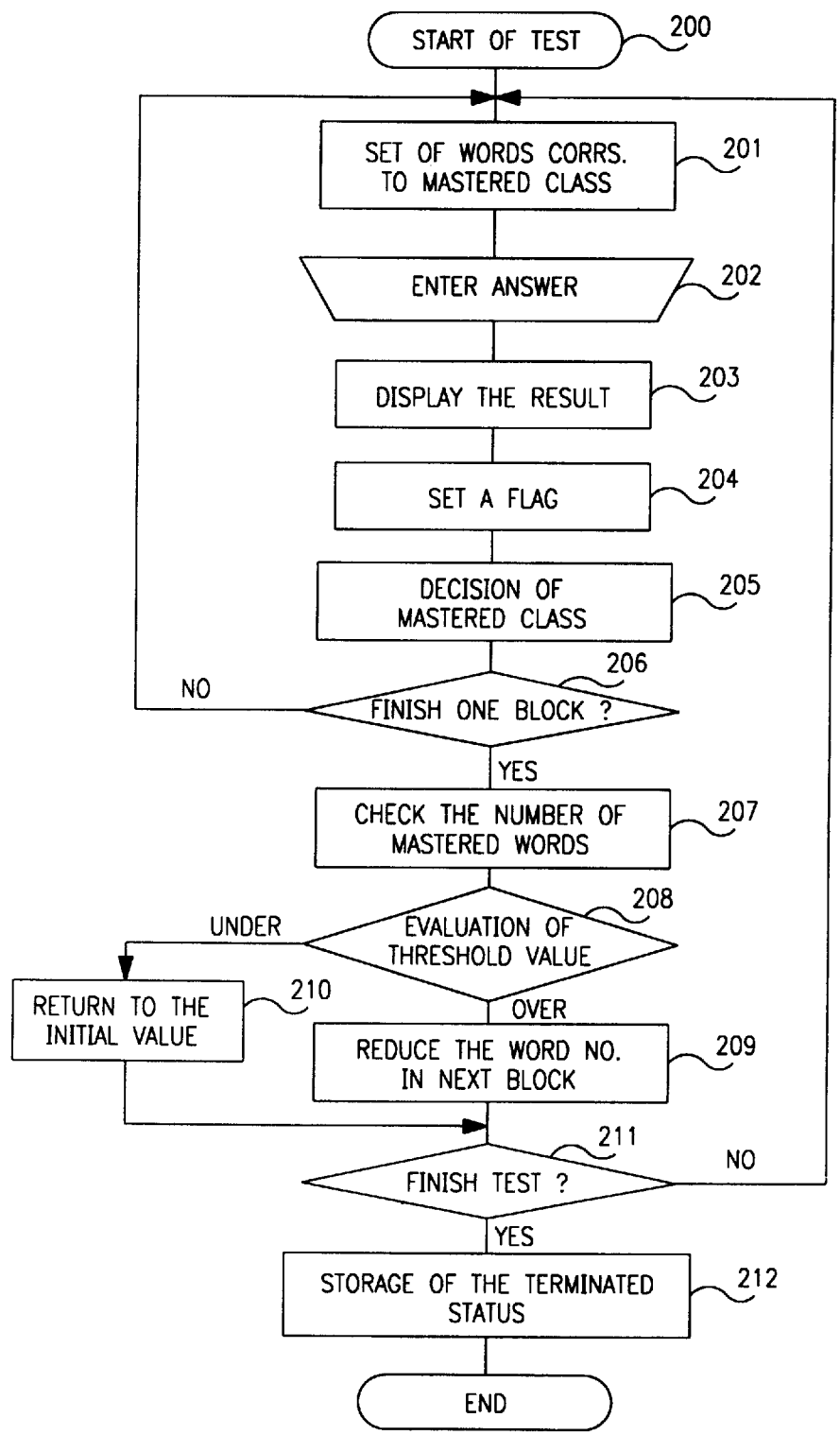
FIG. 16 is a flow chart showing the details of the process of the test in the step 200 shown in FIG. 1.

FIG. 16 is a flow chart showing the detailed test process 200 shown in FIG. 1.

This process comprises the steps of setting the words of the number specified to one of the mastered classes a–e for one block, and evaluating an answer of each word. However, there are some cases where the word number is limited dependently on the number of the unmastered words accumulated. That is, it is difficult to memorize all of the unmastered words in each mastered class, and thus some number of words are not memorized. Considering this presumed number, a number of accumulated, unmastered words is set as a threshold value. When the number of accumulated, unmastered words meets the following relation: threshold value ≦ the number of accumulated, unmastered words, the word number per block (in the third column in the FIG. 17) in the respective mastered classes is modified as shown in the fifth column in FIG. 17. In this way, the words per one block are limited to reduce the load of the learner in accordance with the threshold value.

Now, when the word number is decided, the content 35 shown in FIG. 18 is displayed on the display 5. Such words are displayed one by one in the order of usage frequency in a word display frame 36, and respective phonetic symbols are displayed in a phonetic symbol display frame 37 (step 201). Accordingly, the learner operates the keys on the keyboard 2 to enter the meaning of each word in a romaji-input system (step 202). The answer to the question is displayed in a meaning display frame 38 (step 203). The evaluation of the corrigenda for the answer is effected by entering one or more letters of the meaning, and the correct answer and the explanation are displayed in a display frame 39.

The explanation, for example, the word "experience" is displayed as follows:

[structure being obtained by combining "exper(try)" and "-ence(the ending of a noun)" and meaning being knowledge obtained trying something, that is, "experience". ▽ adjective "experienced" means abundant in experience, the fellow having the root "exper" includes expert, experiment and the liked].

The input results are automatically evaluated for each word and the result is displayed in an evaluation display frame 40. When the input answer (meaning) is incorrect, the word is regarded as an unmastered word and the flag (0) is set after operation of ENTER key 10 (step 204).

Juveniles have a number of opportunities to use word processors or personal computers in recent years and thus they have little resistance to the operation of the keyboard 2. However, it is hard to enter the words in kana one by one and it is unavoidable to take a lot of time for the input. Accordingly, the input of an entire sentence is regarded to be effected by entering at least one head letter or two or more letters in kana for a kana sentence for each word.

For example, an English word "object" means "taisho", "buttai", "hantai suru", etc. in Japanese. It is a very hard work for Japanese unfamiliar to the keyboard to enter the entire sentence. However, if the input of only one head letter such as "t, bu, ha, etc." is acceptable, it is possible to reduce the input time, to learn more words for shorter time, and resulting in an improved efficiency of learning as well as the prevention of the drop in he learning volition.

By the way, in such an input method there is a case where the meaning for the word set in the teaching device is not coincided in expression or description with the word thought by the learner. That is, in the case where the learner memorizes the words in accordance with a dictionary, a textbook etc., the meanings of the words in the dictionary entered in a program of the teaching device are not always consistent with the meanings entered by the learner, resulting in the possibility to give the wrong evaluation by the teaching device. However, the evaluation by teachers and the like are versatile tobe regarded as a correct answer. In such a situation, when the learner considers that this extent will be a correct answer, he can deny the evaluated result and can give an opposite result by operating a function key F1 or F2.

For example, even if the teaching device gave a decision "incorrect", when the learner considers his answer "correct", he can push on the F1 key to change the "incorrect" to "correct". Similarly, even if the teaching device gave a decision "correct", when the learner considers his answer "incorrect" in accordance with the displayed answer and comments, he can push on the F2 key to change the "correct" to "incorrect". By this, the advanced degree in learning words can realistically be evaluated.

Further, when a word is unmastered, the learner can not input the meaning. In such a case, the desired correct answer and its explanation can be displayed in a display frame 39 by operating F2 key of the function keys 9, resulting in the same condition as that of checking a CD(compact disc) electronic dictionary. In this case, the evaluation of the word to the mastered level "0". Then ENTER key 10 is operated to change the displayed content for the next word.

The mastered level is decided for each input of the meaning to one of words (step 205), and the resulting data is memorized in a hard disk of the hard disk unit 4. The question for the word is continued up to the completion of one block of words (step 206). When the questions for the one block words are finished, it is totalized how many words could be mastered from the result of the mastered level to each word (that is, the number of words having the mastered level "1")(step 207), the resulting data is displayed on the upper column as of the content 35 "number of mastered words: m".The expression "q/p" of the content 35 indicates the situation being in progress of this block, for example, "5/20" means that the fifth word out of 20 words is displayed on the display 5.

Then, the threshold values shown in FIG. 17 are evaluated (step 208). When the number of unmastered words exceeds a threshold value, the word number of the following block is reduced (step 209), and when the former is less than the latter, the number of one block is returned to the initial value (step 211). At the test termination, the status is stored in a hard disk and the like, and the teaching device is operated in such a way that the next learning can be resumed from the content of the termination (step 212). In a case of non-termination, the process is returned to step 201, and the subsequent processes are repeatedly executed.

The words are generally displayed one by one, but there is a case where the learner wants to display all of the one block words taught up to now together on the screen. In such a case, when pushing on F4 key of the function keys, the displayed content is changed to a sight display content 41 shown in FIG. 19, wherein words, phonetic symbols, part of speech and its meaning, block number, etc. are displayed together on the display 5. Similarly, all of the subjects taught up to the present time can be displayed together on the display 5 by pushing on F8 key. When the displayed content is to be printed, a printer 6 is operated by pushing on a function key F9. One example of the resulting print format 42 is shown in FIG. 20. In addition to the print format shown in FIG. 20 wherein the print format of English to Japanese is set forth, a Japanese to English format can also be provided, and when the number of copies is specified, the specified number of copies can be printed for instance, by making the order of words random. Further, when pushing F3 key, the original content shown in FIG. 18 is displayed.

The practice described above is related to the translation of English to Japanese. In a case of translation of Japanese to English, the entire digits or letters of the spelling of an English word are entered in English. When the spelling of an English word is unknown, a correct answer and its explanation are displayed on the display 5 by pushing on F2 key. Then, ENTER key 10 is pushed on to display the next Japanese sentence.

Referring to the flow chart shown in FIG. 21, the learning process of step 300 shown in FIG. 1 will be described in detail. This learning process (step 300) is executed after testing (step 200), and the words which could not correctly be answered in step 200 become of the learning objects. The learning is executed by displaying randomized n words one by one on the display 5. After the practice of some words, review is carried out on a displayed content and the review and learning are alternately executed as shown in FIG. 22.

The words are displayed one by one in the learning on the display 5, but plural words are displayed in the review on the display 5. The word number of the unit to be reviewed is dependent on a specific mastered class and as shown in FIG. 22, it is set to each of the mastered classes. That is, up to nine words are displayed on the display 5 (this is defined as one unit), and 15 words are displayed by divided into 7 and 8 word to be displayed on the display 5 at separate times (this is defined as two units).

First, unmastered words are selected on the basis of data of the mastered class, the selected words are randomly arranged (step 301), and they are set as one word unit (one question unit) (step 302). At this time, the content 43 shown in FIG. 23 is displayed on the display 5. The word, part of speech, phonetic symbol, meaning, comment, etc. are displayed in a word display frame 44, a part of speech displaying frame 45, a phonetic symbol display frame 46, a meaning display frame 47, and a content display frame 48, respectively. An English language or a Japanese language is entered by reading the content displayed to make efforts on memorization, and operating the keyboard 2 to enter the spelling of the word. The input spelling and meaning are displayed on an underline. Into the blank portions of the Japanese version and illustrative sentence are entered the answers by operating the keyboard 2. The input of termination is executed by pushing on ENTER key 10.

The illustrative sentence of derivative is preferentially utilized. In a case of having two derivatives, the illustrative sentences 1 and 2 having first and second derivatives, respectively are used. In a case of one derivative, the illustrative sentence 1 having a basic word and the illustrative sentence 2 having the derivative are used. When the spelling or phrase entered into a blank column is incorrect, the frame the ☐ column 49 provided in the head of Japanese version display line is black-painted. Further, in the illustrative sentence, a correct answer is indicated with a red color instead of the expression entered in the blank portion between brackets. In a case of reentering the correct answer, it can be reentered by pushing on ENTER key 10 to clear the preentered portion and operating the keyboard 2. The process after this processing repeats the explanations described above.

When the number of words reaches a defined value (step 303), the review units explained with FIG. 22 are set (step 304), a content 48 shown in FIG. 24 is displayed on the display 5 (step 305). In the content 48 are displayed the meanings in Japanese corresponding to plural English words and parts of speech. After entering the spelling of the English word corresponding to the meaning of the Japanese with keyboard 2 (step 306), ENTER key 10 is pushed on by the learner to make the input of termination. The spelling is input to be displayed in an input field, the check to the input spelling is executed (step 307), and if it is incorrect, the ☐ column 49 provided in the head of the word input position is black-painted to inform the learner (step 308). When the reentrance of the correct answer is required, ENTER key 10 is pushed on (step 309) to clear the preentered portion. Then, the process is returned to step 307 by reentering the spelling (step 310) using the keyboard 2 and the subsequent processes are reexecuted.

When the input of all English words is terminated and all of them are correct (step 312), the image on the display 5 is changed to the next content (step 313). Even if there is only one incorrect word, the processing is returned to step 306, and the subsequent processes are repeatedly executed until the entire field of hte displayed content becomes correct.

Next, referring to a flow chart shown in FIG. 25, the training process will be described in detail.

As shown in FIG. 26, the training process training has three training forms, that is, basic words (form 1), "derivative 1" and "illustrative sentence 1" (form2) and part of speech/meaning (form3), and these three forms are used in a cycle (form 1→form 2→form3). The repeat of training in one block is terminated when all of the words to be practiced are correctly answered three successive times, and such words can be deleted from the training subjects.

As shown in FIG. 25, the words of training to the subject are first decided. The training words are first decided. The training words in this block at first include the words which could not be answered in the test in the block, the words of the mastered level "A" decided in the "block number 4", and the words of the mastered level "B" decided in the "block number 2" out of unmastered words. Thereafter, the three successive time correctly answered words are deleted from the training words (step 401/step 407), then, the specific form is set (step 402), the training of the basic words through the form 1 is started. The content shown in FIG. 27 is displayed in the form 1 on the display 5. To the word and phonetic symbol displayed, the learner operates the keyboard 2 to enter the meaning of the word by a romaji input system (step 404). The check of corrigenda is effected at the stage of entering one or more letters of the meaning for the word (step 404), and the result of the check is displayed in a check display frame 50. When the meaning entered by the learner is incorrect, a comment is displayed in a comment display frame 51 thereby promoting his understanding.

The checked result is stored each time of the check, and it is utilized to check whether or not the word has correctly been answered three consecutive times (step 406). The mastered level of such three successive time successive correctly answered words in the block is decided depending on the respective situations and the mastered level at the stage of entering the training as follows:

|  | mastered level |
|---|---|
| (1) The words incorrectly answered in the testing of this block | |
| 3-successive correct answers from form 1 of the first time: | "A" |
| no 3-successive correct answer from form 1 of the first time, and then 3-successive correct answers: | "B" |
| (2) The words of mastered level "B" | |
| 3-successive correct answers from form 1 of the first time: | "A" |
| no 3-successive correct answer from form 1 of the first time, and then 3-successive correct answers: | "B" |
| (3) The words of mastered level "A" | |
| 3-successive correct answers from form 1 of the first time: | "A" |
| no 3-successive correct answer from form 1 of the first time, and then 3-successive correct answers: | "B" |

At this point of time, it is checked whether the word which became the mastered level "1" appeared or not (step 409), and the mastered word number is checked (step 410). The mastered word number is displayed in the uppermost column of the content 49 each time. The step 403 to step 410 is repeated in a word unit until all of the training words are displayed in this training form (step 411).

When all of the in this block have not correctly been answered three consecutive times (step 412), the training is repeated through the decision of the words (step 401) and the circulation of the training forms (step 402).

In the form 2, the content shown in FIG. 28 is displayed on the display 5. An illustrative sentence in Japanese (derivative) is displayed in an illustrative sentence display frame 53 in the uppermost column of the screen image (step 403). Reading the content, the learner enters the spelling of the word into a blank portion of the illustrative sentence with the keyboard 2, and finally pushes ENTER key 10 on. The check of corrigenda to the content of this input is effected (step 404) and the result is displayed in a check display frame 54. When the learner can not answer to the question, the correct answer is displayed by pushing down F2 key and the comment thereto is displayed in a comment display frame 55. In the form 3, the content shown in FIG. 29 is displayed on the display 5. A part of speech and a meaning are displayed in a display frame 57 (step 408), and they constitute a question. To the question, the learner enters the spelling of a corresponding word by the keyboard 2 and finally pushes on ENTER key 10. The corrigenda to the input are checked (step 409), and the results are displayed in a check display frame 58. When the entered spelling is incorrect, a comment is displayed in a comment display frame 58. Further, when the learner can not answer, a correct answer is displayed and a comment is displayed in the comment display frame 59 by pushing on F2 key.

In the block, it is executed to check whether the mastered levels of the entire words became "1" or not (step 413), and if not, the training of the block is terminated. When the entire words are mastered levels "1", the content 60 indicating that the entire review is possible is displayed on the display 5 (step 414). When the learner wants to execute the entire review, Y key of the keyboard 2 is pushed on (step 416), and if it is unnecessary for the learner, N key is pushed on.

By the way, in the processes of the test and training; an administration table of the advanced degree can be displayed and printed out. FIG. 31 shows one example of the content 62 of the advanced degree administration table. The test result, the mastered word number, the unmastered word number, etc. are displayed by graphs 63, and thus the learning situation is understandable at a look. In addition, an achieved point, a threshold value, and the like are displayed on display 5. The displayed content can be printed out using a printer 6 by pushing on F9 key out of the function key 9. With respect to the achieved point, a man-machine dialogue can also be devised by displaying an illustrated image 64 with each arrival to the respective stages as shown in FIG. 32, thereby blessing the results of training.

In the preferred embodiments described above, the teaching device comprises a desk top type of a personal computer. If a note type of a personal computer is utilized for the teaching device, the teaching device will be portable and will be drived by a battery.

In the above description, English words are of the learning subject, but idiomatic phrases can also be learned. Similarly, an English-Japanese translation is the learning subject, but vice versa can also be executed.

Further, in the preferred embodiments described above, the phonetic symbols are displayed, but a voice output can be carried out by providing a voice synthesis circuit into the computer 1. In this case, that the voice output is automatically effected at least one time synchronously with the display of the words and phonetic symbols, or it is started by operating a specific key by the learner.

As described above, according to the present invention, a testing is effected by a number of questions decided depending to a specific mastered class, a learning content is decided based on the result of this testing, and a training content is set based on the result of the learning, while any question in the testing, learning and training is displayed on the display, and an answer to the question is effected through an input terminal. Therefore, differing from the learning with a dictionary or a book, the learning equal to or more than the learning with a private teacher can efficiently be executed with pleasure.

Further, the present invention provides a check test of displaying a prescribed number of questions successively, receiving the answers to the displayed questions through an input terminal, and deciding a mastered class of a learner the correct answers, so that teaching device can objectively evaluate the mastered class, a testing is effected by the number of questions decided depending on the evaluation, a learning content is decided based on the result of this testing, and a training content is set based on the result of the learning.

The preferred embodiment of the present invention has been disclosed by way of example and it will be understood that other modifications may occur to those skilled in the art without departing from the scope and the spirit of the appended claims.

What is claimed is:

1. A method of teaching a language skills using a computer, a display and a manually controlled input device comprising:
   (a) selectively determining a level of language knowledge at which the language skills are to be taught in response to input from the student through the input device or other means;
   (b) testing the knowledge of the student at the determined level of language knowledge by a predetermined series of questions;
   (c) preparing a multiple question teaching program for the student in response to results of the test;
   (d) performing the teaching program to identify the questions which did not receive correct responses for inclusion in a first supplemental teaching program;
   (e) randomly representing the questions in the first supplemental teaching program to identify the questions which did not receive correct responses for inclusion in a second supplemental teaching program;
   (f) performing the second supplemental teaching program to identify the questions which did not receive correct responses for inclusion in a third supplemental teaching program; and
   (g) randomly representing the questions in the third supplemental teaching program to identify the questions which did not receive correct responses.

2. The method of claim 1 including the steps of evaluating the number of questions in the teaching program which did not receive correct responses and reducing the number of questions in the first supplemental teaching program as a function of the evaluation.

3. In a device for teaching language skills having a computer, a display and a manually controlled input device, the improvement comprising:
   (a) means for selectively determining a level of language knowledge at which the language skills are to be taught in response to input from the student through the input device or other means;
   (b) means for testing the knowledge of the student at the determined level of language knowledge by a predetermined series of questions;
   (c) means for preparing a multiple question teaching program for the student in response to results of the test;
   (d) means for performing the teaching program to identify the questions which did not receive correct responses for inclusion in a first supplemental teaching program;
   (e) means for randomly representing the questions in the first supplemental teaching program to identify the questions which did not receive correct responses for inclusion in a second supplemental teaching program;
   (f) means for performing the second supplemental teaching program to identify the questions which did not receive correct responses for inclusion in a third supplemental teaching program; and
   (g) means for randomly representing the questions in the third supplemental teaching program to identify the questions which did not receive correct responses.

4. A teaching device, comprising:

a display for displaying questions of a teaching subject and answers to said questions by a learner;

means for testing said learner to discriminate correct and incorrect answers among said answers to said questions, said learner being tested by a predetermined number of said questions per one teaching block dependent on a level of said learner on said teaching subject;

means for repeatedly teaching correct answers on said incorrect answers to said learner;

means for determining a level of said learner on each of said questions per said one teaching block; and means for removing a question of said level of said learner higher than a predetermined level from said questions per said one teaching block for said repeatedly teaching means.

5. The teaching device, as defined in claim 4, wherein:

said testing means decreases said predetermined number, when said incorrect answer is greater in number than a threshold value.

6. The teaching device, as defined in claim 4, wherein:

said testing means discriminates said correct and incorrect answers in accordance with one or more initial letters in each of said answers to said questions.

7. The teaching device, as defined in claim 4, wherein:

said testing means discriminates said correct and incorrect answers in regard to meanings of English words and phonetic symbols thereof on said display, when said testing subject is English language.

8. The teaching device, as defined in claim 4, wherein:

said display displays a table including said predetermined number of said questions in accordance with an instruction from one of said testing, repeatedly teaching and determining means.

9. The teaching device, as defined in claim 4, wherein:

said repeatedly teaching means teaches said correct answers by displaying each one of them on said display, and then a group of them.

10. The teaching device, as defined in claim 4, wherein:

said determining means determines said level of said learner under condition that a group of said questions are answered by said learner.

* * * * *